United States Patent
Comrie

(10) Patent No.: US 8,226,913 B2
(45) Date of Patent: *Jul. 24, 2012

(54) REDUCING MERCURY EMISSIONS FROM THE BURNING OF COAL

(75) Inventor: Douglas C. Comrie, Port Clinton, OH (US)

(73) Assignee: NOx II, Ltd., Port Clinton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/098,973

(22) Filed: May 2, 2011

(65) Prior Publication Data

US 2011/0203499 A1 Aug. 25, 2011

Related U.S. Application Data

(63) Continuation of application No. 12/813,214, filed on Jun. 10, 2010, now Pat. No. 7,955,577, which is a continuation of application No. 11/886,269, filed as application No. PCT/US2006/010000 on Mar. 16, 2006, now Pat. No. 7,758,827.

(60) Provisional application No. 60/765,944, filed on Feb. 7, 2006, provisional application No. 60/759,994, filed on Jan. 18, 2006, provisional application No. 60/742,154, filed on Dec. 2, 2005, provisional application No. 60/662,911, filed on Mar. 17, 2005.

(51) Int. Cl.
*B01D 53/64* (2006.01)
*B01J 20/02* (2006.01)
*F23B 90/00* (2011.01)
*F23B 99/00* (2006.01)
*F23K 1/00* (2006.01)

(52) U.S. Cl. .............. 423/210; 423/244.01; 423/244.04; 423/244.07; 423/DIG. 5; 431/2; 431/8; 110/186; 110/188; 110/203; 110/218; 110/324; 110/344; 110/345; 502/400; 502/407; 502/414; 106/705; 106/713; 106/718; 106/734; 422/108; 422/110; 422/111

(58) Field of Classification Search .................. 423/210, 423/244.01, 244.04, 244.07, DIG. 5; 431/2, 431/8; 110/186, 188, 203, 218, 324, 344, 110/345; 502/400, 407, 414; 106/705, 713, 106/718, 734; 422/108, 110, 111
See application file for complete search history.

(56) References Cited

U.S. PATENT DOCUMENTS

| | | | |
|---|---|---|---|
| 174,348 A | 3/1876 | Brown |
| 202,092 A | 4/1878 | Breed |
| 208,011 A | 9/1878 | Eaton |
| 224,649 A | 2/1880 | Child |
| 229,159 A | 6/1880 | McCarty |
| 298,727 A | 5/1884 | Case |
| 346,765 A | 8/1886 | McIntyre |
| 347,078 A | 8/1886 | White |
| 367,014 A | 7/1887 | Wandrey et al. |
| 537,998 A | 4/1895 | Spring et al. |
| 541,025 A | 6/1895 | Gray |
| 625,754 A | 5/1899 | Garland |
| 647,622 A | 4/1900 | Vallet-Rogez |
| 685,719 A | 10/1901 | Harris |
| 688,782 A | 12/1901 | Hillery |
| 700,888 A | 5/1902 | Battistini |
| 744,908 A | 11/1903 | Dallas |
| 846,338 A | 3/1907 | McNamara |
| 894,110 A | 7/1908 | Bloss |
| 896,876 A | 8/1908 | Williams |
| 911,960 A | 2/1909 | Ellis |
| 945,331 A | 1/1910 | Koppers |
| 945,846 A | 1/1910 | Hughes |
| 1,112,547 A | 10/1914 | Morin |
| 1,167,471 A | 1/1916 | Barba |
| 1,167,472 A | 1/1916 | Barba |
| 1,183,445 A | 5/1916 | Foxwell |
| 1,788,466 A | 1/1931 | Lourens |
| 1,984,164 A | 12/1934 | Stock |
| 2,016,821 A | 10/1935 | Nelms |
| 2,059,388 A | 11/1936 | Nelms |
| 2,089,599 A | 8/1937 | Crecelius |
| 2,511,288 A | 6/1950 | Morrell et al. |
| 3,194,629 A | 7/1965 | Dreibelbis et al. |
| 3,288,576 A | 11/1966 | Pierron et al. |
| 3,437,476 A | 4/1969 | Dotson et al. |
| 3,599,610 A | 8/1971 | Spector |
| 3,662,523 A | 5/1972 | Revoir et al. |
| 3,725,530 A | 4/1973 | Kawase et al. |
| 3,764,496 A | 10/1973 | Hultman et al. |
| 3,823,676 A | 7/1974 | Cook et al. |
| 3,838,190 A | 9/1974 | Birke et al. |
| 3,849,267 A | 11/1974 | Hilgen et al. |
| 3,849,537 A | 11/1974 | Allgulin |
| 3,956,458 A | 5/1976 | Anderson |
| 3,961,020 A | 6/1976 | Seki |
| 3,974,254 A | 8/1976 | de la Cuadra Herrera et al. |
| 4,040,802 A | 8/1977 | Deitz et al. |
| 4,075,282 A | 2/1978 | Storp et al. |
| 4,094,777 A | 6/1978 | Sugier et al. |

(Continued)

FOREIGN PATENT DOCUMENTS

| | | |
|---|---|---|
| CN | 1354230 A | 6/2002 |
| CN | 1382657 A | 12/2002 |
| CN | 1421515 | 6/2003 |
| DE | 19745191 A1 | 4/1999 |
| EP | 0433677 A1 | 6/1991 |
| JP | 10-005537 A | 1/1998 |
| JP | 2000-32574 A | 8/2001 |

*Primary Examiner* — Timothy Vanoy

(74) *Attorney, Agent, or Firm* — Harness, Dickey & Pierce, P.L.C.

(57) ABSTRACT

Sorbent components containing halogen, calcium, alumina, and silica are used in combination during coal combustion to produce environmental benefits. Sorbents such as calcium bromide are added to the coal ahead of combustion and other components are added into the flame or downstream of the flame, preferably at minimum temperatures to assure complete formation of the refractory structures that result in various advantages of the methods. When used together, the components reduce emissions of elemental and oxidized mercury; increase the level of Hg, As, Pb, and/or Cl in the coal ash; decrease the levels of leachable heavy metals (such as Hg) in the ash, preferably to levels below the detectable limits; and make a highly cementitious ash product.

47 Claims, No Drawings

U.S. PATENT DOCUMENTS

| | | |
|---|---|---|
| 4,101,631 A | 7/1978 | Ambrosini et al. |
| 4,115,518 A | 9/1978 | Delmon et al. |
| 4,148,613 A | 4/1979 | Myers |
| 4,174,373 A | 11/1979 | Yoshida et al. |
| 4,196,173 A | 4/1980 | deJong et al. |
| 4,226,601 A | 10/1980 | Smith |
| 4,233,274 A | 11/1980 | Allgulin |
| 4,272,250 A | 6/1981 | Burk, Jr. et al. |
| 4,280,817 A | 7/1981 | Chauhan et al. |
| 4,305,726 A | 12/1981 | Brown, Jr. |
| 4,322,218 A | 3/1982 | Nozaki |
| 4,377,599 A | 3/1983 | Willard, Sr. |
| 4,387,653 A | 6/1983 | Voss |
| 4,394,354 A | 7/1983 | Joyce |
| 4,440,100 A | 4/1984 | Michelfelder et al. |
| 4,472,278 A | 9/1984 | Suzuki |
| 4,474,896 A | 10/1984 | Chao |
| 4,503,785 A | 3/1985 | Scocca |
| 4,519,807 A | 5/1985 | Nishino et al. |
| 4,519,995 A | 5/1985 | Schrofelbauer et al. |
| 4,555,392 A | 11/1985 | Steinberg |
| 4,582,936 A | 4/1986 | Ashina et al. |
| 4,602,918 A | 7/1986 | Steinberg et al. |
| 4,629,721 A | 12/1986 | Ueno |
| 4,693,731 A | 9/1987 | Tarakad et al. |
| 4,716,137 A | 12/1987 | Lewis |
| 4,741,278 A | 5/1988 | Franke et al. |
| 4,758,418 A | 7/1988 | Yoo et al. |
| 4,764,219 A | 8/1988 | Yan |
| 4,786,483 A | 11/1988 | Audeh |
| 4,804,521 A | 2/1989 | Rochelle et al. |
| 4,807,542 A | 2/1989 | Dykema |
| 4,824,441 A | 4/1989 | Kindig |
| 4,830,829 A | 5/1989 | Craig, Jr. |
| 4,873,930 A | 10/1989 | Egense et al. |
| 4,886,519 A | 12/1989 | Hayes et al. |
| 4,892,567 A | 1/1990 | Yan |
| 4,915,818 A | 4/1990 | Yan |
| 4,933,158 A | 6/1990 | Aritsuka et al. |
| 4,936,047 A | 6/1990 | Feldmann et al. |
| 4,964,889 A | 10/1990 | Chao |
| 5,013,358 A | 5/1991 | Ball et al. |
| 5,024,171 A | 6/1991 | Krigmont et al. |
| 5,049,163 A | 9/1991 | Huang et al. |
| 5,116,793 A | 5/1992 | Chao et al. |
| 5,126,300 A | 6/1992 | Pinnavaia et al. |
| 5,137,854 A | 8/1992 | Segawa et al. |
| 5,162,598 A | 11/1992 | Hutchings et al. |
| 5,190,566 A | 3/1993 | Sparks et al. |
| 5,238,488 A | 8/1993 | Wilhelm |
| 5,350,728 A | 9/1994 | Cameron et al. |
| 5,368,617 A | 11/1994 | Kindig |
| 5,379,902 A | 1/1995 | Wen et al. |
| 5,409,522 A | 4/1995 | Durham et al. |
| 5,435,980 A | 7/1995 | Felsvang et al. |
| 5,447,703 A | 9/1995 | Baer et al. |
| 5,460,643 A | 10/1995 | Hasenpusch et al. |
| 5,499,587 A | 3/1996 | Rodriquez et al. |
| 5,505,746 A | 4/1996 | Chriswell et al. |
| 5,505,766 A | 4/1996 | Chang |
| 5,571,490 A | 11/1996 | Bronicki et al. |
| 5,587,003 A | 12/1996 | Bulow et al. |
| 5,618,508 A | 4/1997 | Suchenwirth et al. |
| 5,635,150 A | 6/1997 | Coughlin |
| 5,659,100 A | 8/1997 | Lin |
| 5,670,122 A | 9/1997 | Zamansky et al. |
| 5,733,516 A | 3/1998 | DeBerry |
| 5,738,834 A | 4/1998 | Deberry |
| 5,787,823 A | 8/1998 | Knowles |
| 5,810,910 A | 9/1998 | Ludwig et al. |
| 5,897,688 A | 4/1999 | Voogt et al. |
| 5,910,292 A | 6/1999 | Alvarez, Jr. et al. |
| 5,989,506 A | 11/1999 | Markovs |
| 6,024,931 A | 2/2000 | Hanulik |
| 6,083,289 A | 7/2000 | Ono et al. |
| 6,136,749 A | 10/2000 | Gadkaree et al. |
| 6,240,859 B1 | 6/2001 | Jones, Jr. |
| 6,258,334 B1 | 7/2001 | Gadkaree et al. |
| 6,372,187 B1 | 4/2002 | Madden et al. |
| 6,375,909 B1 | 4/2002 | Dangtran et al. |
| 6,475,451 B1 | 11/2002 | Leppin et al. |
| 6,521,021 B1 | 2/2003 | Pennline et al. |
| 6,528,030 B2 | 3/2003 | Madden et al. |
| 6,533,842 B1 | 3/2003 | Maes et al. |
| 6,558,454 B1 | 5/2003 | Chang et al. |
| 6,610,263 B2 | 8/2003 | Pahlman et al. |
| 6,613,110 B2 | 9/2003 | Sanyal |
| 6,719,828 B1 | 4/2004 | Lovell et al. |
| 6,732,055 B2 | 5/2004 | Bagepalli et al. |
| 6,737,031 B2 | 5/2004 | Beal et al. |
| 6,790,420 B2 | 9/2004 | Breen et al. |
| 6,808,692 B2 | 10/2004 | Oehr |
| 6,848,374 B2 | 2/2005 | Srinivasachar et al. |
| 6,878,358 B2 | 4/2005 | Vosteen et al. |
| 6,942,840 B1 | 9/2005 | Broderick |
| 6,953,494 B2 | 10/2005 | Nelson, Jr. |
| 6,962,617 B2 | 11/2005 | Simpson |
| 6,974,564 B2 | 12/2005 | Biermann et al. |
| 6,975,975 B2 | 12/2005 | Fasca |
| 7,758,827 B2 * | 7/2010 | Comrie .......... 423/210 |
| 7,955,577 B2 * | 6/2011 | Comrie .......... 423/210 |
| 2002/0068030 A1 | 6/2002 | Nolan et al. |
| 2002/0102189 A1 | 8/2002 | Madden et al. |
| 2002/0184817 A1 | 12/2002 | Johnson et al. |
| 2003/0103882 A1 | 6/2003 | Biermann et al. |
| 2003/0161771 A1 | 8/2003 | Oehr |
| 2004/0003716 A1 | 1/2004 | Nelson |
| 2004/0013589 A1 | 1/2004 | Vosteen et al. |
| 2004/0086439 A1 | 5/2004 | Vosteen et al. |
| 2004/0219083 A1 | 11/2004 | Schofield |
| 2005/0039598 A1 | 2/2005 | Srinivasachar et al. |
| 2005/0169824 A1 | 8/2005 | Downs et al. |
| 2006/0185226 A1 | 8/2006 | McDonald et al. |
| 2006/0210463 A1 | 9/2006 | Comrie |
| 2007/0180990 A1 | 8/2007 | Downs et al. |
| 2008/0107579 A1 | 5/2008 | Downs et al. |

* cited by examiner

REDUCING MERCURY EMISSIONS FROM THE BURNING OF COAL

CROSS-REFERENCE TO RELATED APPLICATIONS

This application is a continuation of U.S. application Ser. No. 12/813,214 filed Jun. 10, 2010, now U.S. Pat. No. 7,955,577, issued on Jun. 7, 2011; which is a continuation of U.S. application Ser. No. 11/886,269 filed Sep. 13, 2007 now U.S. Pat. No. 7,758,827, which issued Jul. 20, 2010; which is the National Phase filing of PCT/US2006/010000 filed Mar. 16, 2006; which claims the benefit of U.S. Provisional Application No. 60/765,944 filed Feb. 7, 2006 and U.S. Provisional Application No. 60/759,994 filed Jan. 18, 2006; and also claims the benefit of U.S. Provisional Application No. 60/742,154 filed Dec. 2, 2005 and U.S. Provisional Application No. 60/662,911 filed Mar. 17, 2005. The entire disclosures of each of the above applications are hereby incorporated by reference.

INTRODUCTION

The invention provides compositions and methods for reducing the levels of mercury emitted into the atmosphere upon burning of mercury-containing fuels such as coal. In particular, the invention provides for addition of various halogen and other sorbent compositions into the coal burning system during combustion.

Significant coal resources exist around the world capable of meeting large portions of the world's energy needs into the next two centuries. High sulfur coal is plentiful, but requires remediation steps to prevent excess sulfur from being released into the atmosphere upon combustion. In the United States, low sulfur coal exists in the form of low BTU value coal in the Powder River basin of Wyoming and Montana, in lignite deposits in the North Central region of North and South Dakota, and in lignite deposits in Texas. But even when coals contain low sulfur, they still contain non-negligible levels of elemental and oxidized mercury and/or other heavy metals.

Unfortunately, mercury is at least partially volatilized upon combustion of coal. As a result, the mercury tends not to stay with the ash, but rather becomes a component of the flue gases. If remediation is not undertaken, the mercury tends to escape from the coal burning facility into the surrounding atmosphere. Some mercury today is captured by utilities, for example in wet scrubber and SCR control systems. However, most mercury is not captured and is therefore released through the exhaust stack.

Mercury emissions into the atmosphere in the United States are approximately 50 tons per year. A significant fraction of the release comes from emissions from coal burning facilities such as electric utilities. Mercury is a known environmental hazard and leads to health problems for both humans and non-human animal species. To safeguard the health of the public and to protect the environment, the utility industry is continuing to develop, test, and implement systems to reduce the level of mercury emissions from its plants. In combustion of carbonaceous materials, it is desirable to have a process wherein mercury and other undesirable compounds are captured and retained after the combustion phase so that they are not released into the atmosphere.

In addition to wet scrubber and SCR control systems that tend to remove mercury partially from the flue gases of coal combustion, other methods of control have included the use of activated carbon systems. Use of such systems tends to be associated with high treatment costs and elevated capital costs. Further, the use of activated carbon systems leads to carbon contamination of the fly ash collected in exhaust air treatments such as the bag house and electrostatic precipitators.

At the same time, demand for cementitious materials such as portland cement is expected to increase as developed countries maintain their infrastructure and developing countries build and maintain roads, dams, and other major constructions for the benefit of their citizens.

When coal is burned to produce heat energy from combustion of carbonaceous material, the unburned material and particulate combustion products form an ash with pozzolanic and/or cementitious properties. While the chemical composition of coal ash depends on the chemical composition of the coal, the ash normally contains a major amount of silica and alumina, and significant but lesser amount of calcium.

So-called fly ash produced from burning of pulverized coal in a coal fired furnace or boiler is a powdery particulate matter made of the components of coal that do not volatize upon combustion. The ash is normally carried off in the flue gas and is usually collected from the flue gas using conventional apparatus such as electrostatic precipitators, filtration devices such as bag houses, and/or mechanical devices such as cyclones. The burning of coal entails the production of a large amount of coal ash, which must be dealt with by the coal burning facility. For example, under certain circumstances ash from burning coal has been successfully used in portland cement concrete as a partial replacement for portland cement. Coal ash has further been used a component in the production of flowable fill and as a component as stabilized base and sub-based mixtures. In these applications, the amount of ash used, especially as a replacement for portland cement in such applications, is limited by the cementitious nature or lack thereof of the particular ash product.

Even though reuse of the ash is preferred for economic reasons, in many situations, the ash is not suitable to be used as a component of cementitious mixtures. In many cases the ash must be land filled or otherwise treated as a waste product.

Methods and compositions for burning coal to produce an ash product having highly cementitious qualities would be a significant advance, because it would both reduce costs of waste disposal from coal burning utilities and reduce the cost of concrete products for needed building projects.

SUMMARY

Processes and compositions are provided for decreasing emissions of mercury upon combustion of fuels such as coal. Various sorbent compositions are provided that contain components that reduce the level of mercury and/or sulfur emitted into the atmosphere from such combustion. In various embodiments, use of the sorbent compositions leads to a fly ash combustion product from which mercury or other heavy metals do not significantly leach under acidic conditions.

In various embodiments, the sorbent compositions are added directly to the fuel before combustion; into the furnace or fireball while the fuel is burning; into the flue gas post combustion zone; or in various combinations. The sorbent compositions comprise a source of calcium, alumina, and silica, preferably in the form of alkaline powders. In various embodiments, use of a sorbent containing calcium, silica, and alumina as alkaline powders lowers the amount of sulfur and/or mercury emitted from the facility into the atmosphere. In one aspect, use of the alkaline powders lowers the oxidized mercury, for example in systems where the flame temperature is low, for example down to about 1000° F.

In a preferred embodiment, the sorbent also includes a source of halogen, and/or a sorbent containing a source of halogen is separately added into the coal-burning system. Among the halogens, iodine and bromine are preferred. In various embodiments, inorganic bromides make up a part of the sorbent compositions. In various embodiments mercury sorbent compositions containing halogen, especially bromine and/or iodine, are added to the fuel as a powder or a liquid prior to combustion. Alternatively, the sorbent compositions containing halogen such as bromine and iodine are injected into the flue gas at a point after the combustion chamber where the temperature is higher than about 500° C. (932° F.), preferably higher than 1500° F. (about 800° C.), and/or into the furnace during combustion.

In preferred embodiments, mercury emissions from coal burning facilities are reduced to such an extent that 90% or more of the mercury in the coal is captured before release into the atmosphere. Most of the mercury is captured in the fly ash in non-leaching form; corrosion from sulfur gases is also reduced. In preferred embodiments, significant sulfur reduction is achieved.

Methods and compositions are provided for burning coal to produce an ash product that is highly cementitious in nature. In various embodiments, the cementitious nature of the ash allows for formulation of portland cement concrete and similar products with up to 50% or more of the portland cement being substituted by the ash product. In various embodiments, the strength activity index of portland type cement products formulated with up to 50% or more ash is greater than 75% and preferably 100% or greater. Accordingly, in some embodiments, the ash product of the invention is used as the main cementitious material in portland cement concretes, in stabilized base, in sub-base mixtures, in flowable fill (also called controlled low strength material or CLSM), and the like.

The fly ash produced from combusting coal with these sorbent components is generally higher in calcium content than the specifications for class F or class C fly ash, and the combined content of silica, alumina, and iron oxide, while significant, is considerably below the specifications for class F and class C fly ash.

In various embodiments, the invention provides a variety of cement products such as portland cement concrete, flowable fill, stabilized base, and similar products in which the conventional cement (portland cement) otherwise used in the products is replaced in whole or in part with the cementitious ash product described herein. In particular, in preferred embodiments, the cementitious ash product of the current disclosure is used to replace 40% or more of the portland cement conventionally used in such products.

In various embodiments, use of the cementitious ash in building products as total or partial replacement for portland cement results in reduced carbon dioxide emissions that would otherwise result from the manufacture of portland cement. In addition to avoided carbon dioxide emissions from calcining of limestone to make portland cement and the burning of fossil fuels to provide the energy needed to make portland cement, use of the sorbent components tends to increase the efficiency of energy production from burning of coal, further reducing greenhouse emissions from the burning of fossil fuel to produce energy.

DESCRIPTION

Sorbents, sorbent components and methods for their use are described herein; in U.S. Provisional Application No. 60/662,911 filed Mar. 17, 2005; in U.S. Provisional Application No. 60/742,154 filed Dec. 2, 2005; in U.S. Provisional Application No. 60/759,994 filed Jan. 18, 2005; and in U.S. Provisional Application No. 60/765,944 filed Feb. 7, 2006, the disclosures of which are hereby incorporated by reference. Apparatus and methods of injection of the various sorbent compositions are described herein and in U.S. Provisional Application No. 60/759,943 filed Jan. 18, 2006 and U.S. Provisional Application No. 60/760,424 filed Jan. 19, 2006, the disclosures of which are incorporated by reference.

In various embodiments, the invention provides compositions and methods for reducing emissions of mercury that arise from the combustion of mercury-containing fuels such as coal. A commercially valuable embodiment is use of the invention to reduce sulfur and/or mercury emissions from coal burning facilities to protect the environment and comply with government regulations and treaty obligations.

In various embodiments, the methods prevent release of mercury into the atmosphere from point sources, such as coal-burning utilities by capturing the mercury in the ash. Further, the methods prevent release of mercury and other heavy metals into the environment by leaching from solid wastes such as coal ash produced by burning the mercury containing coal. In both these ways, mercury is kept out of bodies of water. Thus, prevention or reduction of mercury emissions from such facilities as coal-burning utilities leads to a variety of environmental benefits, including less air pollution, less water pollution, and less hazardous waste production, with less resulting ground contamination. For convenience but without limitation, advantageous features of the invention are illustrated as preventing air, water, and ground pollution by mercury or other heavy metals.

Various sorbent components are used in combination to treat coal ahead of combustion and/or to be added into the flame or downstream of the flame, preferably at minimum temperatures to assure complete formation of the refractory structures that result in various advantages of the methods. The sorbent components comprise calcium, alumina, silica, and halogen. In various embodiments, together, the components reduce emissions of mercury and sulfur;
reduce emissions of elemental and oxidized mercury;
increase the efficiency of the coal burning process through de-slagging of boiler tubes;
increase the level of Hg, As, Pb, and/or Cl in the coal ash;
decrease the levels of leachable heavy metals (such as Hg) in the ash, preferably to levels below the detectable limits; and
make a highly cementitious ash product.

By calcium is meant a compound or composition that has a non-negligible amount of calcium. For example, many alkaline powders contain 20% or more calcium, based on CaO. Examples are limestone, lime, calcium oxide, calcium hydroxide (slaked lime), portland cement and other manufactured products or by-products of industrial processes, and calcium-containing aluminosilicate minerals. Silica and alumina content is based on $SiO_2$ and $Al_2O_3$ equivalents, even though it is appreciated that silica and alumina are often present in a more complex chemical or molecular form.

As used herein, all percentages are on a weight basis, unless indicated as otherwise. It should be noted that the chemical compositions of various materials described herein are expressed in terms of simple oxides calculated from elemental analysis, typically determined by x-ray fluorescence techniques. While the various simple oxides may be, and often are, present in more complex compounds in the material, the oxide analysis is a useful method for expressing the concentration of compounds of interest in the respective compositions.

Although much of the following discussion will refer to coal as the fuel, it is to be understood that the description of coal burning is for illustrative purposes only and the invention is not necessarily to be limited thereby. For example, other types of facilities that burn fuels with potentially harmful levels of mercury or other heavy metals include incineration plants, such as those used to incinerate household waste, hazardous waste, or sewage sludge. In addition, many facilities burn fuel mixtures that comprise coal as well as other fuels, such as natural gas, synthetic gas, or waste-derived fuels.

A variety of waste streams are incinerated in such plants, which often operate in populated areas for logistical reasons. Household waste can contain mercury from a variety of sources, such as discarded batteries and thermometers as well as a wide variety of consumer items with detectable mercury levels. Hazardous waste streams include mercury from a number of commercial or industrial sources. Sewage sludge contains mercury resulting from ingestion and elimination of mercury-containing foods and from other sources. All of the waste streams also contain mercury from a number of natural sources as well. When burned in an incinerator, the wastes can release volatile mercury or mercury compounds into the air, which tend to settle to the ground close to the incineration plant, leading to local contamination of the soil and groundwater, as well as lowered air quality. Accordingly, in various embodiments of the invention, waste streams containing mercury or other heavy metals are incinerated in the presence of various mercury sorbents added into the incineration system as described below. In preferred embodiments, halogen and preferably silica and alumina are added in sufficient amounts to reduce mercury emissions into the atmosphere and to render mercury non-leachable that is captured in the ash.

Major elements in coal, besides carbon, include silica, alumina, and calcium, along with lesser amounts of iron. In addition, trace heavy metals such as arsenic, antimony, lead, chromium, cadmium, nickel, vanadium, molybdenum, manganese, copper, and barium are normally present. These elements tend to report to the ash upon combustion of coal. Coal also contains significant amounts of sulfur. Upon combustion, the sulfur in coal burns to produce volatile sulfur oxides, which tend to escape from the coal burning utility in gaseous form. It is desired to remediate or reduce the level of sulfur oxides emitted from coal burning plants.

Coal also contains mercury. Although present at a low level, mercury tends to volatilize during combustion and escape from the coal burning utility. Even at the low levels produced from the combustion of coal, the release of mercury into the environment is undesirable because the element is toxic and tends to accumulate in body tissues. Because of mercury's damaging effect on health and the environment, its release has recently come under regulatory control in the United States and elsewhere in the world. Whether mercury is subject to regulatory controls or not, it is highly desirable to reduce the amount of mercury emitted from coal burning utilities.

In a typical coal burning facility, raw coal arrives in railcars and is delivered onto a receiving belt, which leads the coal into a pug mill. After the pug mill, the coal is discharged to a feed belt and deposited in a coal storage area. Under the coal storage area there is typically a grate and bin area; from there a belt transports the coal to an open stockpile area, sometimes called a bunker. Stoker furnaces can be fed with coal from the bunker or from a crusher. For furnaces burning pulverized coal, the coal is delivered by belt or other means to milling equipment such as a crusher and ultimately to a pulverizer. In a storage system, coal is pulverized and conveyed by air or gas to a collector, from which the pulverized coal is transferred to a storage bin, from which the coal is fed to the furnace as needed. In a direct fired system, coal is pulverized and transported directly to the furnace. In a semi-direct system, the coal goes from the pulverizer to a cyclone collector. The coal is fed directly from the cyclone to the furnace.

During operation coal is fed into the furnace and burned in the presence of oxygen. For high btu fuels, typical flame temperatures in the combustion chamber are on the order of 2700° F. (about 1480° C.) to about 3000° F. (about 1640° C.) or even higher, such as 3300° F. (about 1815° C.) to 3600° F. (about 1982° C.).

In various embodiments, sorbent compositions according to the invention are added to the raw coal, in the pug mill, on the receiving belt or feed belt, in the coal storage area, in the collector, in the storage bin, in the cyclone collector, in the pulverizer before or during pulverization, and/or while being transported from the pulverizer to the furnace for combustion. Conveniently, in various embodiments the sorbents are added to the coal during processes that mix the coal such as the in the pug mill or in the pulverizer. In a preferred embodiment, the sorbents are added onto the coal in the pulverizers.

Alternatively or in addition, sorbent components are added into the coal burning system by injecting them into the furnace during combustion of the fuel. In a preferred embodiment, they are injected into the fireball or close to the fireball, for example where the temperature is above 2000° F., above 2300° F., or above 2700° F. According to the design of the burners and the operating parameters of the furnace, effective sorbent addition takes place along with the fuel, with the primary combustion air, above the flame, with or above the overfire air, and so on. Also depending on the furnace design and operation, sorbents are injected from one or more faces of the furnace and/or from one or more corners of the furnace. Addition of sorbent compositions and sorbent components tends to be most effective when the temperature at injection is sufficiently high and/or the aerodynamics of the burners and furnace set up lead to adequate mixing of the powder sorbents with the fuel and/or combustion products. Alternatively or in addition, sorbent addition is made to the convective pathway downstream of the flame and furnace. In various embodiments, optimum injection or application points for sorbents are found by modeling the furnace and choosing parameters (rate of injection, place of injection, distance above the flame, distance from the wall, mode of powder spraying, and the like) that give the best mixing of sorbent, coal, and combustion products for the desired results.

In coal burning systems, hot combustion gases and air move by convection away from the flame through the convective pathway in a downstream direction (i.e., downstream in relation to the fireball). The convective pathway of the facility contains a number of zones characterized by the temperature of the gases and combustion products in each zone. Generally, the temperature of the combustion gas falls as it moves in a direction downstream from the fireball. From the furnace, where the coal in one example is burning at a temperature of approximately 2700° F.-3600° F. (about 1480° C.-1650° C.), the fly ash and combustion gases move downstream in the convective pathway to zones of ever decreasing temperature. To illustrate, downstream of the fireball is a zone with temperature less that 2700° F. Further downstream, a point is reached where the temperature has cooled to about 1500° F. Between the two points is a zone having a temperature from about 1500° F. to about 2700° F. Further downstream, a zone of less than 1500° F. is reached, and so on. Further along in the convective pathway, the gases and fly ash pass through lower temperature zones until the baghouse or electrostatic precipitator is reached, which typically has a temperature of about 300° F. before the gases are emitted up the stack.

The combustion gases contain carbon dioxide as well as various undesirable gases containing sulfur and mercury. The convective pathways are also filled with a variety of ash which is swept along with the high temperature gases. To remove the ash before emission into the atmosphere, particulate removal systems are used. A variety of such removal systems, such as electrostatic precipitators and a bag house, are generally disposed in the convective pathway. In addition, chemical scrubbers can be positioned in the convective pathway. Additionally, there may be provided various instruments to monitor components of the gas such as sulfur and mercury.

Thus, in various embodiments, the process of the present invention calls for the application of sorbents directly into the furnace during combustion (addition "co-combustion")

directly to a fuel such as coal before combustion (addition "pre-combustion");

directly into the gaseous stream after combustion preferably in a temperature zone of greater than 500° C. and preferably greater than 800° C. (addition "post-combustion); or in a combination of pre-combustion, co-combustion, and post-combustion additions.

Application of the sorbents is made "into the coal burning system" in any of pre-combustion, co-combustion, or post-combustion modes, or in any combination. When the sorbents are added into the coal burning system, the coal or other fuel is said to be combusted "in the presence" the various sorbents, sorbent compositions, or sorbent components In a preferred embodiment downstream addition is carried out where the temperature is about 1500° F. (815.5° C.) to about 2700° F. (1482.2° C.). In some aspects, and depending upon the specifics of furnace design and the layout of the convective pathways, the cutoff point or distinction between "into the furnace", "into the fireball", and "into the convective pathways" can be rather arbitrary. At some point, the combustion gases leave what is clearly a burning chamber or furnace and enter a separate structure that is clearly a flue or convective pathway for gases downstream of the furnace. However, many furnaces are quite large and so permit addition of sorbents "into the furnace" at a considerable distance from where the fuel and air are being fed to form the fireball. For example, some furnaces have overfire air injection ports and the like specifically designed to provide additional oxygen at a location above the fireball to achieve more complete combustion and/or control of emissions such as nitrogen oxides. The overfire air ports can be 20 feet or higher above the fuel injection. In various embodiments, sorbent components or compositions are injected directly into the fireball along with coal being fed, at a location above the coal feed above or below the overfire air ports, or at a higher location within the burning chamber, such as at or just under the nose of the furnace. Each of these locations is characterized by a temperature and by conditions of turbulent flow that contribute to mixing of the sorbents with the fuel and/or the combustion products (such as the fly ash). In embodiments involving applying sorbent compositions into the furnace or downstream of the furnace, application is preferably made where the temperature is above 1500° F., preferably above 2000° F., more preferably where the temperature is above 2300° F., and most preferably where the temperature is above 2700° F.

In various embodiments, sorbents are added as coal is burned along with other fuels in co-generation plants. Such plants are flexible in the fuels they burn. In addition to bituminous and sub-bituminous coal, such facilities can also burn waste-derived fuels such without limitation as municipal waste, sewage sludge, pet coke, animal waste, plant waste (such as without limitation wood, rice hulls, wood chips, agricultural waste, and/or sawdust), scrap plastics, shredded tires, and the like. To the extent that the fuels contain mercury and sulfur, use of sorbents as described herein tends to mitigate or lower emissions of sulfur and/or mercury that would otherwise be released into the atmosphere upon combustion. Depending on the fuel value, the flame temperature in such co-generation plants varies upward from about 1000° F.-1200° F. (for low value fuels or fuels containing high proportions of low value biomass or other low-value components) to 2700° F. to 3600° F. or higher (for high BTU coal). In various embodiments, use of sorbents of the invention mitigates mercury emissions from systems burning at relatively lower temperatures. It is believed the sorbents are especially effective at removing oxidized mercury from the flue gases, and that oxidized mercury in the species predominantly formed by combustion at the lower temperatures.

Thus, in various embodiments, co-generation plants burning a combination of coal and a wide variety of other fuels (see above) are treated with sorbent compositions to achieve significant reductions in emissions of mercury and/or sulfur.

In various embodiments described herein, sorbent compositions that tend to reduce or remediate the release of mercury and/or sulfur from coal burning utilities also have the beneficial effect of rendering the ash produced by combustion of the fuel highly cementitious. As a result, the ash is usable in commerce as a partial or complete replacement for portland cement in various cement and concrete products.

Burning the coal with the sorbent compositions described herein results in an ash that has, in various embodiments, increased levels of the heavy metals compared to coal burned without the sorbent, but which nevertheless contains lower levels of leachable heavy metals than the ash produced without the sorbents. As a result, the ash is safe to handle and to sell into commerce, for example as a cementitious material.

To make the ash products, a carbonaceous fuel is burned to produce heat energy from combustion of the carbonaceous material. Unburned material and particulate combustion products form ash, some of which collects at the bottom of the furnace, but the majority of which is collected as fly ash from the flue by precipitators or filters, for example a bag house on a coal burning facility. The content of the bottom ash and the fly ash depends on the chemical composition of the coal and on the amount and composition of sorbent components added into the coal burning facility during combustion.

In various embodiments, mercury emissions from the coal burning facility are monitored. Emissions are monitored as elemental mercury, oxidized mercury, or both. Elemental mercury means mercury in the ground or zero oxidation state, while oxidized mercury means mercury in the +1 or +2 oxidation state. Depending on the level of mercury in the flue gas prior to emission from the plant, the amount of sorbent composition added pre-, co-, and/or post-combustion is raised, lowered, or is maintained unchanged. In general, it is desirable to remove as high a level of mercury as is possible. In typical embodiments, mercury removal of 90% and greater is achieved, based on the total amount of mercury in the coal. This number refers to the mercury removed from the flue gases so that mercury is not released through the stack into the atmosphere. Normally, removal of mercury from the flue gases leads to increased levels of mercury in the ash. To minimize the amount of sorbent added into the coal burning process so as to reduce the overall amount of ash produced in the furnace, it is desirable in many embodiments to use the measurements of mercury emissions to adjust the sorbent composition rate of addition to one which will achieve the desired mercury reduction without adding excess material into the system.

In various embodiments of burning coal or other fuels with the added sorbent components, mercury and other heavy metals in the coal such as arsenic, antimony, lead, and others report to the bag house or electrostatic precipitator and become part of the overall ash content of the coal burning plant; alternatively or in addition, the mercury and heavy metals are found in the bottom ash. As such, mercury and other heavy metals are not emitted from the facility. In general, mercury and other heavy metals in the ash are resistant to leaching under acidic conditions, even though they tend to be present in the ash at elevated levels relative to ash produced by burning coal without the sorbent components described herein. Advantageously, heavy metals in the ash do not leach beyond regulatory levels; in fact, a decreased level of leachable heavy metal is observed in the ash on a ppm basis, even though the ash normally contains a higher absolute level of heavy metals by virtue of being produced by burning with the sorbents. Because in addition the cementitious nature of the ash is enhanced, the ash from the combustion (coal ash) is valuable for sale in commerce and use, for example, as a cementitious material to make portland cements as well as concrete products and ready mixes.

In preferred embodiments, leaching of heavy metals is monitored or analyzed periodically or continuously during combustion. The TCLP procedure of the United States Environmental Protection Agency is a commonly used method. The amount of sorbent, particularly of sorbent components with Si ($SiO_2$ or equivalents) and/or Al ($Al_2O_3$ or equivalents), is adjusted based on the analytical result to maintain the leaching in a desired range.

In one embodiment, a method is provided for burning coal to reduce the amount of mercury released into the atmosphere. The method involves applying a sorbent composition comprising a halogen compound into the system in which the coal is being combusted. The halogen compound is preferably a bromine compound; in a preferred embodiment, the sorbent is free of alkali metal compounds so as to avoid corrosion on boiler tubes or other furnace components. The coal is combusted in the furnace to produce ash and combustion gases. The combustion gases contain mercury, sulfur and other components. To accomplish a desired reduction of mercury in the combustion gases in order to limit release into the atmosphere, the mercury level in the combustion gases is preferably monitored, for example by measuring the level analytically. In preferred embodiments, the amount of the sorbent composition applied is adjusted (i.e., by increasing it, decreasing it, or in some cases deciding to leave it unchanged) depending on the value of the mercury level measured in the combustion gases. In a preferred embodiment, the sorbent is added into the system by applying it to the coal pre-combustion, then delivering the coal containing the sorbent into the furnace for combustion.

In another embodiment, sorbent components comprising a halogen (preferably bromine or iodine, and most preferably bromine) compound and at least one aluminosilicate material are applied into the coal burning system. The components are added separately or as a single sorbent composition, and are optionally added onto the coal pre-combustion, into the furnace during combustion, or into the flue gases downstream of the furnace at suitable temperatures. In a preferred embodiment, the components are added to the coal pre-combustion, and the coal containing the sorbent is then delivered into the furnace for combustion. As before, preferably mercury is monitored in the flue gases and the sorbent application rate is adjusted depending on the value of the measured mercury level. The halogen contributes to lowering the level of mercury emissions, while the aluminosilicate contributes to making mercury captured in the ash non-leaching.

In a related embodiment, a method for reducing leaching of mercury and/or of other heavy metals from ash produced from the combustion of coal or other fuel in a coal burning system or in an incinerator involves introducing sorbents containing silica and alumina into the incinerator or coal burning system during combustion, measuring leaching of mercury and/or other heavy metals from the resulting ash, and adjusting the level of silica and alumina added according to the measured leaching of heavy metals. If leaching is higher than desired, the rate of application of the sorbent can be increased to bring the leaching back down into the desired range. In a preferred embodiment, the sorbent further contains a halogen (e.g. bromine) compound to enhance capture of mercury in the ash.

In one embodiment, the invention provides a method for reducing the amount of oxidized mercury in flue gases that are generated by combustion of mercury-containing carbonaceous fuel such as coal while at the same time producing a cementitious ash product. The method comprises burning the fuel in the presence of an alkaline powder sorbent wherein the powder sorbent comprises calcium, silica, and alumina. The alkaline powder is added to the coal pre-combustion, injected into the furnace during combustion, applied into the flue gases downstream of the furnace (preferably where the temperature is 1500° F. or greater), or in any combination. The powders are alkaline, characterized by a pH above 7 when combined with water, preferably above 8 and preferably above 9. Preferably, the sorbent contains about 0.01 to about 5% by weight of alkalis such as those based on $Na_2O$ and $K_2O$. In various embodiments, the sorbent further contains iron and magnesium. In various embodiments, the aluminum content of the sorbent is higher than the alumina content of portland cement, preferably above about 5% or above about 7% alumina.

While the fuel is burning, a level of mercury (oxidized, elemental, or both) is measured in the flue gases downstream from the furnace. The measured mercury level is compared to a target level and, if the measured level is above the target level, the amount of powder sorbent added relative to the amount of fuel being burned is increased. Alternatively, if the measured level is at or below the target level, the rate of sorbent addition can be decreased or maintained unchanged.

In another embodiment, the powder composition is an alkaline sorbent composition that contains an alkaline calcium component as well as significant levels of silica and alumina. In a non-limiting embodiment, the powder composition comprises 2 to 50% of an aluminosilicate material and 50 to 98% by weight of an alkaline powder comprising calcium. In a preferred embodiment, the alkaline powder comprises one or more of lime, calcium oxide, portland cement, cement kiln dust, lime kiln dust, and sugar beet lime, while the aluminosilicate material contains one or more selected from the group consisting of calcium montmorillonite, sodium montmorillonite, and kaolin. The powder composition is added to the coal at a rate of about 0.1 to about 10% by weight, based on the amount of coal being treated with the sorbents for a batch process, or on the rate of coal being consumed by combustion for a continuous process. In a preferred embodiment, the rate is from 1 to 8% by weight, 2 to 8% by weight, 4 to 8% by weight, 4 to 6% by weight, or about 6% by weight. In preferred embodiments, the powder composition is injected to the fireball or furnace during combustion and/or is applied to the coal under ambient conditions, prior to its combustion. The temperature at the injection point is preferably at least about 1000° F. or higher. For some low value fuels, this corresponds to injection into or close to the fireball.

In another embodiment, the invention provides novel sorbent compositions comprising about 50 to 98% by weight of at least one of portland cement, cement kiln dust, lime kiln dust, sugar beet lime, and 2 to 50% by weight of an aluminosilicate material. In a various embodiments, the compositions further comprise a bromine compound, for example a bromide such as calcium bromide. Use of the sorbents during the coal burning process as described herein tends to lessen the amount of harmful sulfur and mercury products emitted from the facility, while at the same time producing an ash that is environmentally acceptable (e.g. leaching of heavy metals is below regulatory levels and is lower than in ash produced by burning the coal without the sorbent components) and highly cementitious in nature so that the ash serves as a complete or partial (greater than 40%, preferably greater than 50%) replacement for portland cement in cementitious mixtures and processes for their use.

In yet another embodiment, a method is provided for burning a fuel containing mercury and optionally sulfur so that the level of harmful compounds emitted in the combustion gases and released into the environment is reduced. In a preferred embodiment, the method involves applying a sorbent onto the fuel and burning the fuel containing the sorbent to produce gases and fly ash. The sorbent contains bromine, calcium, silica, and alumina.

In a further embodiment, a method for reducing mercury and/or sulfur emitted into the environment during combustion of coal in a coal burning system comprises adding sorbent components comprising bromine, calcium, silica, and alumina into the coal burning system and combusting the coal in the presence of the sorbent components to produce combustion gases and fly ash. The amount of mercury in the combustion gases is measured and level of components containing bromine added into the system is adjusted depending on the measured value of mercury in the combustion gases.

In various embodiments, the four components (calcium, silica, alumina, and bromine) are added together or separately to the coal pre-combustion, to the furnace, and/or to the flue gases at suitable temperature as described herein. Preferably, bromine is present at a level effective to capture, in the ash, at least 90% of the mercury in the coal, and silica and alumina are present at levels effective to produce fly ash with a leaching value of less than 0.2 ppm (200 ppb) with respect to mercury, preferably less than 100 ppb Hg, less than 50 ppb, and most preferably less than 2 ppb with respect to mercury. A level of 2 ppb represents the current lower detectable limit of the TCLP test for mercury leaching.

In a particular embodiment, a dual sorbent system is used wherein calcium, silica, and alumina are added in a powder sorbent, while bromine or other halogen(s) is added in a liquid sorbent. The liquid and powder sorbents are added into the coal burning system onto the coal pre-combustion, into the furnace, into the flue gases (at suitable temperatures as described herein), or in any combination. In a preferred embodiment, liquid sorbent is added to the coal pre-combustion and powder sorbent is added either to the coal pre-combustion or to the furnace during combustion. Treatment levels of the liquid and powder sorbents, as well as preferred compositions, are described herein.

In preferred embodiments, the methods provide coal ash and/or fly ash containing mercury at a level corresponding to capture in the ash of at least 90% of the mercury originally in the coal before combustion. In some embodiments, the mercury level is higher than in known fly ashes due to capture of mercury in the ash rather than release of mercury into the atmosphere. Fly ash produced by the process contains up to 200 ppm mercury or higher; in some embodiments the mercury content of the fly ash is above 250 ppm. Since the volume of ash is normally increased by use of the sorbents (in typical embodiments, the volume of ash about doubles), the increased measured levels of mercury represent significant capture in the ash of mercury that without the sorbents would have been released into the environment. The content in the fly ash of mercury and other heavy metals such as lead, chromium, arsenic, and cadmium is generally higher than in fly ash produced from burning coal without the added sorbents or sorbent components.

In various embodiments, an ash product is produced by burning coal in the presence of sorbent components comprising calcium, silica, alumina, and preferably a halogen such as bromine. The components are added as parts of one or more sorbent compositions into the coal-burning system. In a non-limiting example, sorbent components calcium, silica, and alumina are added together in an alkaline powder sorbent composition that comprises about 2 to 15% by weight $Al_2O_3$, about 30 to 75% by weight CaO, about 5 to 20% by weight $SiO_2$, about 1 to 10% $Fe_2O_3$, and about 0.1 to 5% by weight total alkali, such as sodium oxide and potassium oxide. In a preferred embodiment, the sorbents comprise about 2 to 10% by weight $Al_2O_3$, about 40 to 70% by weight CaO, and about 5 to 15% by weight $SiO_2$ in addition to the total alkalis. In a preferred embodiment, powder sorbent compositions described herein contain one or more alkaline powders containing calcium, along with lesser levels of one or more aluminosilicate materials. The halogen component, if desired, is added as a further component of the alkaline powder or is added separately as part of a liquid or powder composition. Advantageously, use of the sorbents leads to a reduction in the levels of sulfur, mercury, other heavy metals such as lead and arsenic, and/or chlorine from the coal burning system.

In another embodiment, the method of the invention provides coal ash containing mercury at a level corresponding to capture in the ash of at least 90% of the mercury originally in the coal before combustion. A process for making the coal ash involves burning coal in the presence of added calcium, silica, and alumina, and preferably in the further presence of a halogen such as bromine. In a preferred embodiment, ash is prepared by burning coal in the presence of sorbents or sorbent components described herein. Preferably, the mercury in the coal ash is non-leaching in that it exhibits a concentration of mercury in the extract of less than 0.2 ppm when tested using the Toxicity Characteristic Leaching Procedure (TCLP), test Method 1311 in "Test Methods for Evaluating Solid Waste, Physical/Chemical Methods," EPA Publication SW-846-Third Edition, as incorporated by reference in 40 CFR §260.11. It is normally observed that fly ash from burning coal with the sorbents described herein has less leachable mercury than ash produced from burning coal without the sorbent, even though the total mercury content in ash produced from the sorbent treated coal is higher by as much as a factor of 2 or more over the level in ash produced by burning without the sorbents. To illustrate, typical ash from burning of PRB coal contains about 100-125 ppm mercury; in various embodiments, ash produced by burning PRB coal with about 6% by weight of the sorbents described herein has about 200-250 ppm mercury or more.

In another embodiment, the invention provides a hydraulic cement product containing portland cement and from 0.1% to about 99% by weight, based on the total weight of the cement product, of a coal ash or fly ash described above.

In a further embodiment, the invention provides a pozzolanic product comprising a pozzolan and from 0.01% to about 99% by weight, based on the total weight of the pozzolanic product of the ash described above.

The invention also provides a cementitious mixture containing the hydraulic cement product.

The invention further provides a concrete ready mix product containing aggregate and the hydraulic cement product.

In another embodiment, a cementitious mixture contains coal ash described herein as the sole cementitious component; in these embodiments, the ash is a total replacement for conventional cements such as portland cement. The cementitious mixtures contain cement and optionally aggregate, fillers, and/or other admixtures. The cementitious mixtures are normally combined with water and used as concrete, mortars, grout, flowable fill, stabilized base, and other applications.

The methods thus encompass burning coal with the added sorbents to produce coal ash and energy for heat or electricity generation. The ash is then recovered and used to formulate cementitious mixtures including cements, mortars, and grouts.

Sorbent compositions used in various embodiments of the invention described above and herein contain components that contribute calcium, silica, and/or alumina, preferably in the form of alkaline powders. In various embodiments, the compositions also contain iron oxide, as well as basic powders based on sodium oxide ($Na_2O$) and potassium oxide ($K_2O$). In a non-limiting example, the powder sorbent contains about 2-10% by weight $Al_2O_3$, about 40-70% CaO, about 5-15% $SiO_2$, about 2-9% $Fe_2O_3$, and about 0.1-5% total alkalis such as sodium oxide and potassium oxide. The components comprising calcium, silica, and alumina—and other elements if present—are combined together in a single composition or are added separately or in any combination as components to the fuel burning system. In preferred embodiments, use of the sorbents leads to reductions in the amount of sulfur and/or mercury released into the atmosphere. In various embodiments, use of the sorbent compositions leads to the removal of mercury, especially oxidized mercury. In addition, the compositions reduce the amount of sulfur given off from combustion by a virtue of their calcium content.

Advantageously, the sorbent compositions contain suitable high levels of alumina and silica. It is believed that the presence of alumina and/or silica leads to several advantages seen from use of the sorbent. To illustrate, it is believed that the presence of alumina and/or silica and/or the balance of the silica/alumina with calcium, iron, and other ingredients contributes to the low acid leaching of mercury and/or other heavy metals that is observed in ash produced by combustion of coal or other fuels containing mercury in the presence of the sorbents.

In various embodiments, it is observed that use of the sorbent compositions during combustion of coal or other fuel leads to the formation of a refractory lining on the walls of the furnace and on the boiler tubes. It is believed that such a refractory lining reflects heat in the furnace and leads to higher water temperature in the boilers. In various embodiments, it is also observed that use of the sorbent results in reduced scale formation or slagging around the boiler tubes. In this way, use of the sorbents leads to cleaner furnaces, but more importantly improves the heat exchange between the burning coal and the water in the boiler tubes. As a result, in various embodiments use of the sorbents leads to higher water temperature in the boiler, based on burning the same amount of fuel. Alternatively, it has been observed that use of the sorbent allows the feed rate of, for example, coal to be reduced while maintaining the same power output or boiler water temperature. In an illustrative embodiment, use of a sorbent at a 6% rate results in combustion of a coal/sorbent composition that produces as much power as a composition of the same weight that is all coal. It is seen in such embodiments that use of the sorbent, which is normally captured in the fly ash and recycled, actually increases the efficiency of the coal burning process, leading to less consumption of fuel. Advantageously in such a process, the fly ash, which is normally increased in volume by virtue of the use of the sorbent, is recycled for use in portland cement manufacture and the like, it having an improved cementitious nature and low heavy metal leaching.

As noted, the components that contribute calcium, silica, and/or alumina are preferably provided as alkaline powders. Without being limited by theory, it is believed that the alkaline nature of the sorbent components leads at least in part to the desirable properties described above. For example, it is believed the alkaline nature of the powders leads to a reduction in sulfur pitting. After neutralization, it is believed a geopolymeric ash is formed in the presence of the sorbents, coupling with silica and alumina present in the sorbent to form a ceramic like matrix that reports as a stabilized ash. The stabilized ash is characterized by very lowing leaching of mercury and other heavy metals. In some embodiments, the leaching of mercury is below detectable limits.

Sources of calcium for the sorbent compositions of the invention include, without limitation, calcium powders such as calcium carbonate, limestone, dolomite, calcium oxide, calcium hydroxide, calcium phosphate, and other calcium salts. Industrial products such as limestone, lime, slaked lime, and the like contribute major proportions of such calcium salts. As such, they are suitable components for the sorbent compositions of the invention.

Other sources of calcium include various manufactured products. Such products are commercially available, and some are sold as waste products or by-products of other industrial processes. In preferred embodiments, the products further contribute either silica, alumina, or both to the compositions of the invention. Non-limiting examples of industrial products that contain silica and/or alumina in addition to calcium include portland cement, cement kiln dust, lime kiln dust, sugar beet lime, slags (such as steel slag, stainless steel slag, and blast furnace slag), paper de-inking sludge ash, cupola arrester filter cake, and cupola furnace dust.

These and optionally other materials are combined to provide alkaline powders or mixtures of alkaline powders that contain calcium, and preferably also contain silica and alumina. Other alkaline powders containing calcium, silica, and alumina include pozzolanic materials, wood ash, rice hull ash, class C fly ash, and class F fly ash. In various embodiments, these and similar materials are suitable components of sorbent compositions, especially if the resulting composition containing them as components falls within the preferred range of 2 to 15% by weight $Al_2O_3$, about 30 to 75% by weight CaO, about 5 to 20% by weight $SiO_2$, about 1 to 10% $Fe_2O_3$, and about 0.1 to 5% by weight total alkali. Mixtures of materials are also used. Non-limiting examples include mixtures of portland cement and lime, and mixtures containing cement kiln dust, such as cement kiln dust and lime kiln dust.

Sugar beet lime is a solid waste material resulting from the manufacture of sugar from sugar beets. It is high in calcium content, and also contains various impurities that precipitate in the liming procedure carried out on sugar beets. It is an item of commerce, and is normally sold to landscapers, farmers, and the like as a soil amendment.

Cement kiln dust (CKD) generally refers to a byproduct generated within a cement kiln or related processing equipment during portland cement manufacturing.

Generally, CKD comprises a combination of different particles generated in different areas of the kiln, pre-treatment equipment, and/or material handling systems, including for example, clinker dust, partially to fully calcined material dust, and raw material (hydrated and dehydrated) dust. The composition of the CKD varies based upon the raw materials and fuels used, the manufacturing and processing conditions, and the location of collection points for CKD within the cement manufacturing process. CKD can include dust or particulate matter collected from kiln effluent (i.e., exhaust) streams, clinker cooler effluent, pre-calciner effluent, air pollution control devices, and the like.

While CKD compositions will vary for different kilns, CKD usually has at least some cementitious and/or pozzolanic properties, due to the presence of the dust of clinker and calcined materials. Typical CKD compositions comprise silicon-containing compounds, such as silicates including tricalcium silicate, dicalcium silicate; aluminum-containing compounds, such as aluminates including tricalcium aluminate; and iron-containing compounds, such as ferrites including tetracalcium aluminoferrite. CKD generally comprises calcium oxide (CaO). Exemplary CKD compositions comprise about 10 to about 60% calcium oxide, optionally about 25 to about 50%, and optionally about 30 to about 45% by weight. In some embodiments, CKD comprises a concentration of free lime (available for a hydration reaction with water) of about 1 to about 10%, optionally of about 1 to about 5%, and in some embodiments about 3 to about 5%. Further, in certain embodiments, CKD comprises compounds containing alkali metals, alkaline earth metals, and sulfur, inter alia.

Other exemplary sources for the alkaline powders comprising calcium, and preferably further comprising silica and alumina, include various cement-related byproducts (in addition to portland cement and CKD described above). Blended-cement products are one suitable example of such a source. These blended cement products typically contain mixes of portland cement and/or its clinker combined with slag(s) and/or pozzolan(s) (e.g., fly ash, silica fume, burned shale). Pozzolans are usually siliceous materials that are not in themselves cementitious, but which develop hydraulic cement properties when reacted with free lime (free CaO) and water. Other sources are masonry cement and/or hydraulic lime, which include mixtures of portland cement and/or its clinker with lime or limestone. Other suitable sources are aluminous cements, which are hydraulic cements manufactured by burning a mix of limestone and bauxite (a naturally occurring, heterogeneous material comprising one or more aluminum hydroxide minerals, plus various mixtures of silica, iron oxide, titania, aluminum silicates, and other impurities in minor or trace amounts). Yet another example is a pozzolan cement, which is a blended cement containing a substantial concentration of pozzolans. Usually the pozzolan cement comprises calcium oxide, but is substantially free of portland cement. Common examples of widely-employed pozzolans include natural pozzolans (such as certain volcanic ashes or tuffs, certain diatomaceous earth, burned clays and shales) and synthetic pozzolans (such as silica fume and fly ash).

Lime kiln dust (LKD) is a byproduct from the manufacturing of lime. LKD is dust or particulate matter collected from a lime kiln or associated processing equipment. Manufactured lime can be categorized as high-calcium lime or dolomitic lime, and LKD varies based upon the processes that form it. Lime is often produced by a calcination reaction conducted by heating calcitic raw material, such as calcium carbonate ($CaCO_3$), to form free lime CaO and carbon dioxide ($CO_2$). High-calcium lime has a high concentration of calcium oxide and typically some impurities, including aluminum-containing and iron-containing compounds. High-calcium lime is typically formed from high purity calcium carbonate (about 95% purity or greater). Typical calcium oxide content in an LKD product derived from high-calcium lime processing is greater than or equal to about 75% by weight, optionally greater than or equal to about 85% by weight, and in some cases greater than or equal to about 90% by weight. In some lime manufacturing, dolomite ($CaCO_3.MgCO_3$) is decomposed by heating to primarily generate calcium oxide (CaO) and magnesium oxide (MgO), thus forming what is known as dolomitic lime. In LKD generated by dolomitic lime processing, calcium oxide can be present at greater than or equal to about 45% by weight, optionally greater than about 50% by weight, and in certain embodiments, greater than about 55% by weight. While LKD varies based upon the type of lime processing employed, it generally has a relatively high concentration of free lime. Typical amounts of free lime in LKD are about 10 to about 50%, optionally about 20 to about 40%, depending upon the relative concentration of calcium oxide present in the lime product generated.

Slags are generally byproduct compounds generated by metal manufacturing and processing. The term "slag" encompasses a wide variety of byproduct compounds, typically comprising a large portion of the non-metallic byproducts of ferrous metal and/or steel manufacturing and processing. Generally, slags are considered to be a mixture of various metal oxides, however they often contain metal sulfides and metal atoms in an elemental form.

Various examples of slag byproducts useful for certain embodiments of the invention include ferrous slags, such as those generated in blast furnaces (also known as cupola furnaces), including, by way of example, air-cooled blast furnace slag (ACBFS), expanded or foamed blast furnace slag, pelletized blast furnace slag, granulated blast furnace slag (GBFS), and the like. Steel slags can be produced from basic oxygen steelmaking furnaces (BOS/BOF) or electric arc furnaces (EAF). Many slags are recognized for having cementitious and/or pozzolanic properties, however the extent to which slags have these properties depends upon their respective composition and the process from which they are derived, as recognized by the skilled artisan. Exemplary slags comprise calcium-containing compounds, silicon-containing compounds, aluminum-containing compounds, magnesium-containing compounds, iron-containing compounds, manganese-containing compounds and/or sulfur-containing compounds. In certain embodiments, the slag comprises calcium oxide at about 25 to about 60%, optionally about 30 to about 50%, and optionally about 30 to about 45% by weight. One example of a suitable slag generally having cementitious properties is ground granulated blast furnace slag (GGBFS).

As described above, other suitable examples include blast (cupola) furnace dust collected from air pollution control devices attached to blast furnaces, such as cupola arrester filter cake. Another suitable industrial byproduct source is paper de-inking sludge ash. As recognized by those of skill in the art, there are many different manufactured/industrial process byproducts that are feasible as a source of calcium for the alkaline powders that form the sorbent compositions of the invention. Many of these well known byproducts comprise alumina and/or silica, as well. Some, such as lime kiln dust, contain major amounts of CaO and relatively small amounts of silica and alumina. Combinations of any of the exemplary manufactured products and/or industrial byproducts are also contemplated for use as the alkaline powders of certain embodiments of the invention.

In various embodiments, desired treat levels of silica and/or alumina are above those provided by adding materials such as portland cement, cement kiln dust, lime kiln dust, and/or sugar beet lime. Accordingly, it is possible to supplement such materials with aluminosilicate materials, such as without limitation clays (e.g. montmorillonite, kaolins, and the like) where needed to provide preferred silica and alumina levels. In various embodiments, supplemental aluminosilicate materials make up at least about 2%, and preferably at least about 5% by weight of the various sorbent components added into the coal burning system. In general, there is no upper limit from a technical point of view as long as adequate levels of calcium are maintained. However, from a cost standpoint, it is normally desirable to limit the proportion of more expensive aluminosilicate materials. Thus, the sorbent components preferably comprise from about 2 to 50%, preferably 2 to 20%, and more preferably, about 2 to 10% by weight aluminosilicate material such as the exemplary clays. A non-limiting example of a sorbent is about 93% by weight of a blend of CKD and LKD (for example, a 50:50 blend or mixture) and about 7% by weight of an aluminosilicate clay.

In various embodiments, an alkaline powder sorbent composition contains one or more calcium-containing powders such as portland cement, cement kiln dust, lime kiln dust, various slags, and sugar beet lime, along with an aluminosilicate clay such as, without limitation, montmorillonite or kaolin. The sorbent composition preferably contains sufficient $SiO_2$ and $Al_2O_3$ to form a refractory-like mixture with calcium sulfate produced by combustion of the sulfur-containing coal in the presence of the CaO sorbent component such that the calcium sulfate is handled by the particle control system; and to form a refractory mixture with mercury and other heavy metals so that the mercury and other heavy metals are not leached from the ash under acidic conditions. In preferred embodiments, the calcium containing powder sorbent contains by weight a minimum of 2% silica and 2% alumina, preferably a minimum of 5% silica and 5% alumina. Preferably, the alumina level is higher than that found in portland cement, that is to say higher than about 5% by weight, preferably higher than about 6% by weight, based on $Al_2O_3$.

In various embodiments, the sorbent components of the alkaline powder sorbent composition work together with optional added halogen (such as bromine) compound or compounds to capture chloride as well as mercury, lead, arsenic, and other heavy metals in the ash, render the heavy metals non-leaching under acidic conditions, and improve the cementitious nature of the ash produced. As a result, emissions of harmful elements are mitigated, reduced, or eliminated, and a valuable cementitious material is produced as a by-product of coal burning.

Suitable aluminosilicate materials include a wide variety of inorganic minerals and materials. For example, a number of minerals, natural materials, and synthetic materials contain silicon and aluminum associated with an oxy environment along with optional other cations such as, without limitation, Na, K, Be, Mg, Ca, Zr, V, Zn, Fe, Mn, and/or other anions, such as hydroxide, sulfate, chloride, carbonate, along with optional waters of hydration. Such natural and synthetic materials are referred to herein as aluminosilicate materials and are exemplified in a non-limiting way by the clays noted above.

In aluminosilicate materials, the silicon tends to be present as tetrahedra, while the aluminum is present as tetrahedra, octahedra, or a combination of both. Chains or networks of aluminosilicate are built up in such materials by the sharing of 1, 2, or 3 oxygen atoms between silicon and aluminum tetrahedra or octahedra. Such minerals go by a variety of names, such as silica, alumina, aluminosilicates, geopolymer, silicates, and aluminates. However presented, compounds containing aluminum and/or silicon tend to produce silica and alumina upon exposure to high temperatures of combustion in the presence of oxygen In one embodiment, aluminosilicate materials include polymorphs of $SiO_2.Al_2O_3$. For example, silliminate contains silica octahedra and alumina evenly divided between tetrahedra and octahedra. Kyanite is based on silica tetrahedra and alumina octahedra. Andalusite is another polymorph of $SiO_2.Al_2O_3$.

In other embodiments, chain silicates contribute silicon (as silica) and/or aluminum (as alumina) to the compositions of the invention. Chain silicates include without limitation pyroxene and pyroxenoid silicates made of infinite chains of $SiO_4$ tetrahedra linked by sharing oxygen atoms.

Other suitable aluminosilicate materials include sheet materials such as, without limitation, micas, clays, chrysotiles (such as asbestos), talc, soapstone, pyrophillite, and kaolinite. Such materials are characterized by having layer structures wherein silica and alumina octahedra and tetrahedra share two oxygen atoms. Layered aluminosilicates include clays such as chlorites, glauconite, illite, polygorskite, pyrophillite, sauconite, vermiculite, kaolinite, calcium montmorillonite, sodium montmorillonite, and bentonite. Other examples include micas and talc.

Suitable aluminosilicate materials also include synthetic and natural zeolites, such as without limitation the analcime, sodalite, chabazite, natrolite, phillipsite, and mordenite groups. Other zeolite minerals include heulandite, brewsterite, epistilbite, stilbite, yagawaralite, laumontite, ferrierite, paulingite, and clinoptilolite. The zeolites are minerals or synthetic materials characterized by an aluminosilicate tetrahedral framework, ion exchangeable "large cations" (such as Na, K, Ca, Ba, and Sr) and loosely held water molecules.

In other embodiments, framework or 3D silicates, aluminates, and aluminosilicates are used. Framework aluminosilicates are characterized by a structure where $SiO_4$ tetrahedra, $AlO_4$ tetrahedra, and/or $AlO_6$ octahedra are linked in three dimensions. Non-limiting examples of framework silicates containing both silica and alumina include feldspars such as albite, anorthite, andesine, bytownite, labradorite, microcline, sanidine, and orthoclase.

In one aspect, the sorbent powder compositions are characterized in that they contain a major amount of calcium, preferably greater than 20% by weight based on calcium oxide, and that furthermore they contain levels of silica, and/or alumina higher than that found in commercial products such as portland cement. In preferred embodiments, the sorbent compositions comprise greater than 5% by weight alumina, preferably greater than 6% by weight alumina, preferably greater than 7% by weight alumina, and preferably greater than about 8% by weight alumina.

Coal or other fuel is treated with sorbent components at rates effective to control the amount of sulfur and/or mercury released into the atmosphere upon combustion. In various embodiments, total treatment levels of the sorbent components ranges from about 0.1% to about 20% by weight, based on the weight of the coal being treated or on the rate of the coal being consumed by combustion, when the sorbent is a powder sorbent containing calcium, silica, and alumina. When the sorbent components are combined into a single composition, the component treat levels correspond to sorbent treat levels. In this way a single sorbent composition can be provided and metered or otherwise measured for addition into the coal burning system. In general, it is desirable to use a minimum amount of sorbent so as not to overload the system with excess ash, while still providing enough to have a desired effect on sulfur and/or mercury emissions. Accordingly, in preferred embodiments, the treatment level of sorbent ranges from about 1% to about 10% by weight, and preferably from about 1 or 2% by weight to about 10% by weight. For many coals, an addition rate of 6% by weight of powder sorbent has been found to be acceptable.

The powder sorbents containing calcium, silica, and alumina as described herein are generally effective to reduce the amount of sulfur in gases emitted from the coal burning facility. For reduction of sulfur emissions, it is preferred to provide calcium in the sorbent components at a molar ratio of at least 1:1, and preferably above 1:1, measured against the moles of sulfur in the fuel (such as coal) being burned. If it is desired to avoid production of excess ash, the amount of calcium delivered by way of the sorbent can be limited to, say, a maximum molar ratio of 3:1, again measured against sulfur in the coal.

In some embodiments, the amount of mercury released is also mitigated, lowered, or eliminated by use of such sorbents even without additional halogen. It is believed that the sorbents are effective at removing oxidized mercury in systems where the flame temperature is as low as 1000° F. However, in many embodiments, including some in which the flame temperature is considerably higher than 1000° F., it is preferable to treat the coal with sorbent compositions that contain a halogen compound. The use of the halogen compound along with the alkaline powder sorbent tends to reduce the amount of unoxidized mercury in the gases of combustion.

Sorbent compositions comprising a halogen compound contain one or more organic or inorganic compounds that contain a halogen. Halogens include chlorine, bromine, and iodine. Preferred halogens are bromine and iodine. The halogen compounds are sources of the halogens, especially of bromine and iodine. For bromine, sources of the halogen include various inorganic salts of bromine including bromides, bromates, and hypobromites. In various embodiments, organic bromine compounds are less preferred because of their cost or availability. However, organic sources of bromine containing a suitably high level of bromine are considered within the scope of the invention. Non-limiting examples of organic bromine compounds include methylene bromide, ethyl bromide, bromoform, and carbon tetrabromide. Non-limiting inorganic sources of iodine include hypoiodites, iodates, and iodides, with iodides being preferred. Organic iodine compounds can also be used.

When the halogen compound is an inorganic substituent, it is preferably a bromine or iodine containing salt of an alkaline earth element. Exemplary alkaline earth elements include beryllium, magnesium, and calcium. Of halogen compounds, particularly preferred are bromides and iodides of alkaline earth metals such as calcium. Alkali metal bromine and iodine compounds such as bromides and iodides are effective in reducing mercury emissions. But in some embodiments, they are less preferred as they tend to cause corrosion on the boiler tubes and other steel surfaces and/or contribute to tube degradation and/or firebrick degradation. In various embodiments, it has been found desirable to avoid potassium salts of the halogens, in order to avoid problems in the furnace.

In various embodiments, it has been found that the use of alkaline earth salts such as calcium tends to avoid such problems with sodium and/or potassium. Thus in various embodiments, the sorbents added into the coal burning system contain essentially no alkali metal-containing bromine or iodine compounds, or more specifically essentially no sodium-containing or potassium-containing bromine or iodine compounds.

In various embodiments, sorbent compositions containing halogen are provided in the form of a liquid or of a solid composition. In various embodiments, the halogen-containing composition is applied to the coal before combustion, is added to the furnace during combustion, and/or is applied into flue gases downstream of the furnace. When the halogen composition is a solid, it can further contain the calcium, silica, and alumina components described herein as the powder sorbent. Alternatively, a solid halogen composition is applied onto the coal and/or elsewhere into the combustion system separately from the sorbent components comprising calcium, silica, and alumina. When it is a liquid composition it is generally applied separately.

In various embodiments, liquid mercury sorbent comprises a solution containing 5 to 60% by weight of a soluble bromine or iodine containing salt. Non-limiting examples of preferred bromine and iodine salts include calcium bromide and calcium iodide. In various embodiments, liquid sorbents contain 5-60% by weight of calcium bromide and/or calcium iodide. For efficiency of addition to the coal prior to combustion, in various embodiments it is preferred to add mercury sorbents having as high level of bromine or iodine compound as is feasible. In a non-limiting embodiment, the liquid sorbent contains 50% or more by weight of the halogen compound, such as calcium bromide or calcium iodide.

In various embodiments, the sorbent compositions containing a halogen compound further contain a nitrate compound, a nitrite compound, or a combination of nitrate and nitrite compounds. Preferred nitrate and nitrite compounds include those of magnesium and calcium, preferably calcium.

To further illustrate, one embodiment of the present invention involves the addition of liquid mercury sorbent directly to raw or crushed coal prior to combustion. For example, mercury sorbent is added to the coal in the coal feeders. Addition of liquid mercury sorbent ranges from 0.01 to 5%. In various embodiments, treatment is at less than 5%, less than 4%, less than 3%, or less than 2%, where all percentages are based on the amount of coal being treated or on the rate of coal consumption by combustion. Higher treatment levels are possible, but tend to waste material, as no further benefit is achieved. Preferred treatment levels are from 0.025 to 2.5% by weight on a wet basis. The amount of solid bromide or iodide salt added by way of the liquid sorbent is of course reduced by its weight fraction in the sorbent. In an illustrative embodiment, addition of bromide or iodide compound is at a low level such as from 0.01% to 1% by weight based on the solid. When a 50% by weight solution is used, the sorbent is then added at a rate of 0.02% to 2% to achieve the low levels of addition. For example, in a preferred embodiment, the coal is treated by a liquid sorbent at a rate of 0.02 to 1%, preferably 0.02 to 0.5% calculated assuming the calcium bromide is about 50% by weight of the sorbent. In a typical embodiment, approximately 1%, 0.5%, or 0.25% of liquid sorbent containing 50% calcium bromide is added onto the coal prior to combustion, the percentage being based on the weight of the coal. In a preferred embodiment, initial treatment is started at low levels (such as 0.01% to 0.1%) and is incrementally increased until a desired (low) level of mercury emissions is achieved, based on monitoring of emissions. Similar treatment levels of halogen are used when the halogen is added as a solid or in multi-component compositions with other components such as calcium, silica, alumina, iron oxide, and so on.

When used, liquid sorbent is sprayed, dripped, or otherwise delivered onto the coal or elsewhere into the coal burning system. In various embodiments, addition is made to the coal or other fuel at ambient conditions prior to entry of the fuel/sorbent composition into the furnace. For example, sorbent is added onto powdered coal prior to its injection into the furnace. Alternatively or in addition, liquid sorbent is added into the furnace during combustion and/or into the flue gases downstream of the furnace. Addition of the halogen containing mercury sorbent composition is often accompanied by a drop in the mercury levels measured in the flue gases within a minute or a few minutes; in various embodiments, the reduction of mercury is in addition to a reduction achieved by use of an alkaline powder sorbent based on calcium, silica, and alumina.

In another embodiment, the invention involves the addition of a halogen component (illustratively a calcium bromide solution) directly to the furnace during combustion. In another embodiment, the invention provides for an addition of a calcium bromide solution such as discussed above, into the gaseous stream downstream of the furnace in a zone characterized by a temperature in the range of 2700° F. to 1500° F., preferably 2200° F. to 1500° F. In various embodiments, treat levels of bromine compounds, such as calcium bromide are divided between co-, pre- and post-combustion addition in any proportion.

In one embodiment, various sorbent components are added onto coal prior to its combustion. The coal is preferably particulate coal, and is optionally pulverized or powdered according to conventional procedures. In a non-limiting example, the coal is pulverized so that 75% by weight of the particles passes through a 200 mesh screen (a 200 mesh screen has hole diameters of 75 μm). In various embodiments, the sorbent components are added onto the coal as a solid or as a combination of a liquid and a solid. Generally, solid sorbent compositions are in the form of a powder. If a sorbent is added as a liquid (illustratively as a solution of one or more bromine or iodine salts in water), in one embodiment the coal remains wet when fed into the burner. In various embodiments, a sorbent composition is added onto the coal continuously at the coal burning facility by spraying or mixing onto the coal while it is on a conveyor, screw extruder, or other feeding apparatus. In addition or alternatively, a sorbent composition is separately mixed with the coal at the coal burning facility or at the coal producer. In a preferred embodiment, the sorbent composition is added as a liquid or a powder to the coal as it is being fed into the burner. For example, in a preferred commercial embodiment, the sorbent is applied into the pulverizers that pulverize the coal prior to injection. If desired, the rate of addition of the sorbent composition is varied to achieve a desired level of mercury emissions. In one embodiment, the level of mercury in the flue gases is monitored and the level of sorbent addition adjusted up or down as required to maintain the desired mercury level.

In various embodiments, levels of mercury and/or sulfur emitted from the facility are monitored with conventional analytical equipment using industry standard detection and determination methods. In one embodiment, monitoring is conducted periodically, either manually or automatically. In a non-limiting example, mercury emissions are monitored once an hour to ensure compliance with government regulations. To illustrate, the Ontario Hydro method is used. In this known method, gases are collected for a pre-determined time, for example one hour. Mercury is precipitated from the collected gases, and the level of elemental and/or oxidized mercury is quantitated using a suitable method such as atomic absorption. Monitoring can also take more or less frequently than once an hour, depending on technical and commercial feasibility. Commercial continuous mercury monitors can be set to measure mercury and produce a number at a suitable frequency, for example once every 3 to 7 minutes. In various embodiments, the output of the mercury monitors is used to control the rate of addition of mercury sorbent. Depending on the results of monitoring, the rate of addition of the mercury sorbent is adjusted by either increasing the level of addition; decreasing it; or leaving it unchanged. To illustrate, if monitoring indicates mercury levels are higher than desired, the rate of addition of sorbent is increased until mercury levels return to a desired level. If mercury levels are at desired levels, the rate of sorbent addition can remain unchanged. Alternatively, the rate of sorbent addition can be lowered until monitoring indicates it should be increased to avoid high mercury levels. In this way, mercury emission reduction is achieved and excessive use of sorbent (with concomitant increase of ash) is avoided.

Mercury is monitored in the convective pathway at suitable locations. In various embodiments, mercury released into the atmosphere is monitored and measured on the clean side of the particulate control system. Mercury can also be monitored at a point in the convective pathway upstream of the particulate control system. Experiments show that as much as 20 to 30% of the mercury in coal is captured in the ash and not released into the atmosphere when no mercury sorbent is added. In preferred embodiments, addition of mercury sorbents described herein raises the amount of mercury capture to 90% or more. Mercury emissions into the atmosphere are correspondingly reduced.

In various embodiments, sorbent components or a sorbent composition is added more or less continuously to the coal before combustion, to the furnace during combustion, and/or to the convective pathway in the 1500° F. to 2700° F. zone as described above. In various embodiments, automatic feedback loops are provided between the mercury monitoring apparatus and the sorbent feed apparatus. This allows for a constant monitoring of emitted mercury and adjustment of sorbent addition rates to control the process.

In preferred embodiments, mercury and sulfur are monitored using industry standard methods such as those published by the American Society for Testing and Materials (ASTM) or international standards published by the International Standards Organization (ISO). An apparatus comprising an analytical instrument is preferably disposed in the convective pathway downstream of the addition points of the mercury and sulfur sorbents. In a preferred embodiment, a mercury monitor is disposed on the clean side of the particulate control system. Alternatively or in addition, the flue gases are sampled at appropriate locations in the convective pathway without the need to install an instrument or monitoring device. In various embodiments, a measured level of mercury or sulfur is used to provide feedback signals to pumps, solenoids, sprayers, and other devices that are actuated or controlled to adjust the rate of addition of a sorbent composition into the coal burning system. Alternatively or in addition, the rate of sorbent addition can be adjusted by a human operator based on the observed levels of mercury and/or sulfur.

In various embodiments, the ash produced by burning coal in the presence of the sorbents described herein is cementitious in that it sets and develops strength when combined with water. The ash tends to be self-setting due its relatively high level of calcium. The ash serves alone or in combination with portland cement as a hydraulic cement suitable for formulation into a variety of cementitious mixtures such as mortars, concretes, and grouts.

The cementitious nature of ash produced as described herein is demonstrated for example by consideration of the strength activity index of the ash, or more exactly, of a cementitious mixture containing the ash. As described in ASTM C311-05, measurement of the strength activity index is made by comparing the cure behavior and property development of a 100% portland cement concrete and a test concrete wherein 20% of the portland cement is replaced with an equal weight of a test cement. In the standard test, strength is compared at 7 days and at 28 days. A "pass" is considered to be when the strength of the test concrete is 75% of the strength of the portland cement concrete or greater. In various embodiments, ashes of the invention exhibit of strength activity of 100% to 150% in the ASTM test, indicating a strong "pass". Similar high values are observed when tests are run on test mixtures with other than an 80:20 blend of portland cement to ash. In various embodiments, a strength activity index of 100% to 150% is achieved with blends of 85:15 to 50:50, where the first number of the ratio is portland cement and the second number of the ratio is ash prepared according to the invention. In particular embodiments, the strength development of an all-ash test cementitious mixture (i.e., one where ash represents 100% of the cement in the test mixture) is greater than 50% that of the all-portland cement control, and is preferably greater than 75%, and more preferably 100% or more, for example 100-150%. Such results demonstrate the highly cementitious nature of ash produced by burning coal or other fuel in the presence of the sorbent components described herein.

Because the ash resulting from combustion of coal according to the invention contains mercury in a non-leaching form, it is available to be sold into commerce. Non-limiting uses of spent or waste fly ash or bottom ash include as a component in a cement product such as portland cement. In various embodiments, cement products contain from about 0.1% up to about 99% by weight of the coal ash produced by burning compositions according to the invention. In one aspect, the non-leaching property of the mercury and other heavy metals in the coal ash makes it suitable for all known industrial uses of coal ash.

Coal ash according to the invention, especially the fly ash collected by the particle control systems (bag house, electrostatic precipitators, etc.) is used in portland cement concrete (PCC) as a partial or complete replacement for portland cement. In various embodiments, the ash is used as a mineral admixture or as a component of blended cement. As an admixture, the ash can be total or partial replacement for portland cement and can be added directly into ready mix concrete at the batch plant. Alternatively, or in addition, the ash is inter-ground with cement clinker or blended with portland cement to produce blended cements.

Class F and Class C fly ashes are defined for example in U.S. Standard ASTM C 618. The ASTM Standard serves as a specification for fly ash when it is used in partial substitution for portland cement. It is to be noted that coal ash produced by the methods described herein tends to be higher in calcium and lower in silica and alumina than called for in the specifications for Class F and Class C fly ash in ASTM C 618. Typical values for the fly ash of the invention is >50% by weight CaO, and <25% $SiO_2/Al_2O_3/Fe_2O_3$. In various embodiments, the ash is from 51 to 80% by weight CaO and from about 2 to about 25% of total silica, alumina, and iron oxide. It is observed that fly ash according to the invention is highly cementitious, allowing for substitutions or cutting of the portland cement used in such cementitious materials and cementitious materials by 50% or more. In various applications, the coal ash resulting from burning coal with sorbents described herein is sufficiently cementitious to be a complete (100%) replacement for portland cement in such compositions.

To further illustrate, the American Concrete Institute (ACI) recommends that Class F fly ash replace from 15 to 25% of portland cement and Class C fly ash replace from 20 to 35%. It has been found that coal ash produced according to the methods described herein is sufficiently cementitious to replace up to 50% of the portland cement, while maintaining 28 day strength development equivalent to that developed in a product using 100% portland cement. That is, although in various embodiments the ash does not qualify by chemical composition as Class C or Class F ash according to ASTM C 618, it nevertheless is useful for formulating high strength concrete products.

Coal ash made according to the invention can also be used as a component in the production of flowable fill, which is also called controlled low strength material or CLSM. CLSM is used as a self leveling, self compacting back fill material in place of compacted earth or other fill. The ash described herein is used in various embodiments as a 100% replacement for portland cement in such CLSM materials. Such compositions are formulated with water, cement, and aggregate to provide a desired flowability and development of ultimate strength. For example, the ultimate strength of flowable fill should not exceed 1035 kPa (150 pounds per square inch) if removability of the set material is required. If formulated to achieve higher ultimate strength, jack hammers may be required for removal. However, when it is desired to formulate flowable fill mixes to be used in higher load bearing applications, mixtures containing a greater range of compressive strength upon cure can be designed.

Coal ash produced according to the methods described herein is also usable as a component of stabilized base and sub base mixtures. Since the 1950's numerous variations of the basic lime/fly ash/aggregate formulations have been used as stabilized base mixtures. An example of the use of stabilized base is used as a stabilized road base. To illustrate, gravel roads can be recycled in place of using ash according to the composition. An existing road surface is pulverized and re-deposited in its original location. Ash such as produced by the methods described herein is spread over the pulverized road material and mixed in. Following compaction, a seal coat surface is placed on the roadway. Ash according to the invention is useful in such applications because it contains no heavy metals that leach above regulatory requirements. Rather, the ash produced by methods of the invention contains less leachable mercury and less leachable other heavy metals (such as arsenic and lead) than does coal ash produced by burning coal without the sorbents described herein.

Thus, the invention provides various methods of eliminating the need to landfill coal ash or fly ash resulting from combustion of coal that contains high levels of mercury. Instead of a costly disposal, the material can be sold or otherwise used as a raw material.

In a preferred embodiment, use of the sorbents results in a cementitious ash that can replace portland cement in whole or in part in a variety of applications. Because of the re-use of the cementitious product, at least some portland cement manufacture is avoided, saving the energy required to make the cement, and avoiding the release of significant amounts of carbon dioxide which would have arisen from the cement manufacture. Other savings in carbon dioxide emissions result from the reduced need for lime or calcium carbonate in desulfurization scrubbers. The invention thus provides, in various embodiments, methods for saving energy and reducing green house emissions such as carbon dioxide. Further detail of various embodiments of this aspect of the invention are given below.

Portland cement is manufactured in a wet or a dry process kiln. While the wet and dry processes differ, both processes heat the raw material in stages. Cement manufacturing raw materials comprise sources of calcium, silica, iron, and alumina, and usually include limestone, as well as a variety of other materials, such as clay, sand, and/or shale, for example. The first stage is a pre-heating stage that drives off any moisture from the raw materials, removes water of hydration, and raises the material temperature up to approximately 1500° F. The second stage is the calcination stage which generally occurs between about 1500° F. and 2000° F., where the limestone ($CaCO_3$) is converted to lime (CaO) by driving off carbon dioxide ($CO_2$) in a calcination reaction. The raw materials are then heated to a maximum temperature of between about 2500° F. to 3000° F. in the burning zone, where they substantially melt and flux, thus forming inorganic compounds, such as tricalcium silicate, dicalcium silicate, tricalcium aluminate, and tetracalcium aluminoferrite. A typical analysis of portland cement products shows that they contain approximately 65-70% CaO, 20% $SiO_2$, 5% $Al_2O_3$, 4% $Fe_2O_3$, with lesser amounts of other compounds, such as oxides of magnesium, sulfur, potassium, sodium, and the like. The molten raw material is cooled to solidify into an intermediate product in small lumps, known as "clinker" that is subsequently removed from the kiln. Clinker is then finely ground and mixed with other additives (such as a set-retardant, gypsum) to form portland cement. Portland cement can then be mixed with aggregates and water to form concrete.

Cement production is an energy sensitive process in which a combination of raw materials is chemically altered through intense heat to form a compound of binding properties. Cement manufacturing is the largest non-energy industrial source of carbon dioxide emissions. The emissions result from heating limestone, which constitutes approximately 80% of the feed to cement kilns. During cement production, high temperatures are used to transform the limestone into lime, releasing carbon dioxide into the atmosphere. In this process, one molecule of calcium carbonate is decomposed into one molecule of carbon dioxide gas and one molecule of calcium oxide.

The cement manufacturer utilizes nearly 100% of the calcium oxide obtained from calcinated calcium carbonate. Thus, the amount of calcium oxide in the cement clinker is a good measure of the carbon dioxide produced during production. In an example, to estimate carbon dioxide emission from cement production, an emission factor is derived by multiplying the fraction of lime in the cement clinker by a constant that reflects the mass of carbon released per unit of lime. In one example, assuming an average lime content of 64.6% based on recommendations of the International Panel for Climate Control, an emissions factor of 0.138 tons of carbon per ton of clinker produced is obtained. Additional carbon dioxide may be released as a result of adding extra lime to make masonry cement, a more plastic cement that typically is used in mortar.

In cement making, carbon dioxide emissions result from energy use and from decomposition of calcium carbonate during clinker production. Depending on the fuel source that provides the energy, carbon dioxide emissions may vary. For example, the use of a cleaner burning fuel, such as natural gas, produces less carbon dioxide emissions than the use of a fuel such as coal. In various embodiments, the invention described above may be used in the production of cement. In such embodiments, the use of the invention in the production of cement will reduce carbon dioxide emissions.

In various embodiments, the invention described herein, may be used in the production of cement to produce carbon dioxide emission credits by lowering carbon dioxide emission in the production of cement. In preferred embodiments, a point source for air emissions, such as a cement plant or a coal-fired power plant, is brought into compliance with the Kyoto protocol.

Although the invention is not to be limited by theory, it is believed that the sorbent compositions described above provide additional or supplemental sources of silica and alumina into the coal burning process. Combustion of the coal with the added silica and alumina forms a geopolymeric matrix such as is known in cold ceramics. Although coal naturally contains small amounts of silica and/or alumina, it is believed that the amount of the materials naturally occurring in coal is normally not sufficient to provide the geopolymeric matrix upon combustion. Further, the silica and alumina naturally occurring in coal is not necessarily balanced with the natural occurring calcium in order to provide optimum sulfur and/or mercury capture and/or cementitious ash product upon combustion.

In various embodiments, the invention provides methods for improving the leaching quality of heavy metals such as mercury from coal. The methods involve adding sufficient silica and/or alumina to the coal to cause a geopolymer to form upon combustion. Preferably, the silica and alumina are added along with sufficient alkali powders to reduce sulfur pitting. The alkali powders tend to neutralize the silica and alumina, with formation of geopolymeric ash along with coupling silica and/or alumina to form a ceramic like matrix that reports as a stabilized ash. It may also be that the alumina and silica burning with the coal forms a refractory like mixture compound with mercury, lead, arsenic, cadmium, antimony, cobalt, copper, manganese, zinc, and/or other heavy metals. As a result, the resulting coal ash or fly ash containing heavy metals is resistant to leaching under standard conditions. As noted above, the non-leaching quality of the coal ash leads to commercial advantages because the product would no longer be considered as a hazardous material.

EXAMPLES

In Examples 1-6, coals of varying BTU value, sulfur, and mercury content are burned in the CTF furnace at the Energy Environmental Research Center (EERC) at the University of North Dakota. Percent mercury is reported based on the total amount of the element in the coal prior to combustion. Percentage sulfur removal is a percentage reduction above baseline, the baseline determined by measuring sulfur emissions from burning without sorbent.

Example 1

This example illustrates the mercury sorption ability of a calcium bromide/water solution when applied to a Powder River basin sub-bituminous coal. The as-fired coal has a moisture content of 2.408%, ash content of 4.83%, sulfur content of 0.29%, a heating value of 8,999 BTU and a mercury content of 0.122 µg/g. Combustion without sorbent results in a mercury concentration of 13.9 µg/m³ in the exhaust gas. The fuel is ground to 70% passing 200 mesh and blended with 6% of a sorbent powder and 0.5% of a sorbent liquid, based on the weight of the coal. The powder contains by weight 40-45% portland cement, 40-45% calcium oxide, and the remainder calcium- or sodium montmorillonite. The liquid is a 50% by weight solution of calcium bromide in water.

The sorbents are mixed directly with the fuel for three minutes and then stored for combustion. The treated coal is fed to the furnace. Combustion results in a 90% mercury (total) removal at the bag house outlet and a 80% removal of sulfur as measured at the bag house outlet.

Example 2

This example illustrates the use of powder and liquid sorbents applied to three bituminous coals of varying mercury content. All coals are prepared as in example #1, with the same addition levels of sorbents.

| Parameter | | Coal | % of Mercury Removal | % Sulfur Removal |
|---|---|---|---|---|
| % Moisture | 8.48 | Pittsburgh, | 97.97 | 40.0 |
| % Sulfur | 2.28 | Seam, Bailey | | |
| Mercury | 16.2 µg/m³ | Coal | | |
| BTU value | 13,324 | | | |
| % Moisture | 10.46 | Freeman | | |
| % Sulfur | 4.24 | Crown III | 97.9 | 36.0 |
| Mercury | 8.53 µg/m³ | | | |
| BTU value | 11,824 | | | |
| % Moisture | 1.0 | Kentucky | 90.1 | 52.0 |
| % Sulfur | 1.25 | Blend | | |
| Mercury | 5.26 µg/m³ | | | |
| BTU value | 12,937 | | | |

Example 3

This example illustrates addition of a mercury sorbent post-combustion. Pittsburgh Seam-Bailey Coal is ground to 70% passing 200 mesh. No sorbent was added to the fuel pre-combustion. Liquid sorbent containing 50% calcium bromide in water is duct injected into the gaseous stream of the furnace in the 2200° F.-1500° F. zone. The liquid sorbent is injected at the rate of approximately 1.5% by weight of the coal.

| Coal Type | Sorbent Composition | % S reduction | # Hg Reduction |
|---|---|---|---|
| Pittsburgh Seam-Bailey Coal | 50% CaBr₂ 50% H₂O | 28.13 | 96.0 |

Example 4

This example illustrates addition of a liquid and a powder sorbent post-combustion. No sorbent was added directly to the fuel. Both fuels are bituminous and noted as Freeman Crown III and Pittsburgh Seam-Bailey Coal. In both cases the coal was ground to 70% minus 200 mesh prior to combustion. The powder and liquid sorbents are as used in Example 1. Rates of liquid and powder addition (percentages based on the weight of the coal being burned), as well as mercury and sulfur reduction levels, are presented in the table.

| Coal Type | Liquid sorbent injection rate | Powder sorbent injection rate | S Reduction | Hg Reduction |
|---|---|---|---|---|
| Freeman Crown III | 1.0 | 4.0 | 36.27 | 97.89 |
| Pittsburgh Seam - Bailey Coal | 1.5 | 6.10 | 33.90 | 96.00 |

Example 5

Pittsburgh Seam Bailey Coal is prepared as in Example 1. The powder sorbent of Example 1 is added to the coal pre-combustion at 9.5% by weight. The liquid sorbent of Example 1 (50% calcium bromide in water) is injected post-combustion in the 1500° F.-2200° F. zone at a rate of 0.77%, based on the burn rate of the coal. Sulfur reduction is 56.89% and mercury reduction is 93.67%.

Example 6

Kentucky Blend Coal is prepared as in Example 1. The powder sorbent of Example 1 is added to the coal pre-combustion at 6% by weight. The liquid sorbent of Example 1 (50% calcium bromide in water) is injected post-combustion in the 1500° F.-2200° F. zone at a rate of 2.63%, based on the burn rate of the coal. Sulfur reduction is 54.91% and mercury reduction is 93.0%.

In Examples 7-10, coals of varying BTU value, sulfur, and mercury content are burned in a variety of boilers at electrical utilities. Percent mercury reduction is reported based on the total amount of the element in the coal prior to combustion. Percentage sulfur removal is a percentage reduction above baseline, the baseline determined by measuring sulfur emissions from burning without sorbent.

Example 7

A fuel containing bituminous and sub-bituminous coals, pet coke, wood chips, and rubber tire scraps is burned in a stoker furnace to produce 60 megawatts of power. The furnace is operating in a balanced draft manner. Baseline emissions of mercury from burning the fuel with no added sorbent indicate the mercury is mostly in the oxidized form. After establishing a baseline, a powder sorbent composition is added at a treat rate of 5.5-6% by weight to the furnace about two feet above the grate through the fly ash recycle/reinjection tubes of the furnace. After steady state is reached, the mercury capture is 96%. The powder sorbent composition is 93% by weight of a 50:50 mixture of cement kiln dust and lime kiln dust; and 7% by weight calcium montmorillonite. While maintaining addition of the powder sorbent composition, a liquid sorbent containing 50% by weight calcium bromide in water is added onto the fuel prior to combustion at a rate of 0.5%, based on the weight of the fuel being consumed. On addition of the liquid sorbent, the mercury capture increases to 99.5%.

Example 8

PRB coal (pulverized to 75% passing 200 Mesh) is burned in a tangentially fired boiler operating in a balanced draft manner to produce 160 megawatts of electric power. After establishing baseline S and Hg emissions from burning of the coal without added sorbent, a powder sorbent composition as in Example 7 is added at a treat level of 5.5-6% into the furnace. Addition is made through a lance positioned 4 feet from the inside wall of the furnace and 20 feet above the fireball. The temperature of the flue gases at the point of injection is about 2400° F. to 2600° F., measured by a temperature sensor. Sulfur capture is increased by 65% over baseline. Mercury capture is 3%, based on the total amount of mercury in the PRB coal. Then, while continuing addition of the powder sorbent, a 50% calcium bromide in water solution is added to the pulverized coal in the coal feeders by drip feed at a treat rate of 0.5%, based on the rate of coal consumption. Mercury capture increases to 90%.

Example 9

PRB coal pulverized to about 200 mesh is burned in a tangentially fired furnace operating in a positive draft manner to produce about 164 megawatts of electric power. After establishing baseline sulfur and mercury emissions from burning the coal without added sorbent (the mercury is predominantly in elemental form in the flue gas emissions), a powder sorbent composition as in Example 7 is added at a treatment rate of 5.5-6.0% by weight of fuel into the furnace just below the neck of the furnace, about 20 feet above the fireball. The temperature at the injection point is about 3000° F. to 3300° F. Addition is made through a series of 3 lances along one side of the furnace. Each lance conveys approximately the same amount of powder and protrudes approximately 3 feet into the furnace from the inside wall. Sulfur capture is increased by 50% over baseline. Mercury capture is approximately 1-3% over baseline. While continuing addition of the powder sorbent composition into the furnace, a 50% by weight solution of calcium bromide in water is added directly to the fuel in the fuel feeder at a rate of approximately 0.2% by weight, based on the weight of coal being consumed by combustion. Mercury capture increases to 90%.

Example 10

The same process as Example 9 is also followed except the powder sorbent is added directly to the coal feeders (upstream of the furnace) rather than directly into the furnace. The same sulfur and mercury reductions are observed as with Example 9.

Example 11

PRB coal is burned in a positive draft tangentially fired boiler to generate electricity for consumer use. Powdered coal (75% passing 200 mesh) is fed to the boiler. Before introduction of the powdered coal into the boiler, a powder sorbent is added to the coal at a rate of 6% by weight, based on the rate of coal being consumed by combustion. The powder sorbent contains 93% by weight of a 50/50 mixture of cement kiln dust and lime kiln dust, and 7% by weight of calcium montmorillonite. At the same time, a 50% by weight solution of calcium bromide in water is dripped onto the coal at a rate of 0.1 to 2% by weight based on the rate of consumption of coal by combustion. Fly ash samples are collected before addition of sorbents (baseline), and after addition of the powder and liquid sorbents. The levels of chlorine and heavy metals are determined according to standard methods. Results are in the table (Table 1).

TABLE 1

Fly Ash Composition with and without sorbents

| Element | Test - After sorbent addition (ppm except for chlorine) | Baseline - Prior to sorbent addition (ppm except for chlorine) |
|---|---|---|
| As | 59.3 | 26.5 |
| Ba | 1.3 | 1.4 |
| Cd | 2.3 | 1.1 |
| Co | 44.8 | 38.5 |
| Cr | 52.0 | 34.3 |
| Cu | 61.0 | 48.8 |
| Mn | 455.7 | 395.5 |
| Mo | 26.0 | 31.5 |
| Ni | 208.5 | 325.5 |
| Pb | 45.8 | 31.3 |
| Sb | 23.0 | 7.3 |
| V | 473.0 | 874.5 |
| Zn | 3954.0 | 974.7 |
| Mercury | 0.246 | 0.128 |
| Chlorine | 0.940% | 0.56% |

It is seen that use of the sorbents increases the level of several heavy metals found in the fly ash. For example, arsenic, cadmium, chromium, lead, mercury, and chlorine are present at higher levels in the test ash than in the baseline. This is believed to represent increased capture of the elements in the ash. The increased level of zinc in the test ash is unexplained. However, it could be due to the fact that a great deal of de-slagging is observed from the boiler tubes upon use of sorbents of the invention. It could be that the increased levels of zinc are attributable to material removed from the boiler tubes during combustion with the sorbents.

Example 12

Next the ash samples are tested according to the TCLP procedure of the U.S. Environmental Protection Agency (EPA) to determine the acid leaching thresholds of key elements. Results are in Table 2.

TABLE 2

Fly Ash TCLP Test Results

| Element | EPA Threshold Limit (ppm) | Baseline - prior to sorbent addition (ppm) | Test - with sorbent addition (ppm) |
|---|---|---|---|
| Arsenic | 5.0 | <0.04 | <0.04 |
| Barium | 100.0 | 0.814 | 0.313 |
| Cadmium | 1.0 | <0.04 | <0.04 |
| Chromium | 5.0 | 0.030 | <0.007 |
| Lead | 5.0 | 0.513 | 0.096 |
| Mercury | 0.20 | 0.095 | 0.078 |
| Selenium | 1.0 | <0.07 | <0.07 |
| Silver | 5.0 | 3.835 | 3.291 |

Table 2 shows that, while the ash is higher in absolute levels of elements such as arsenic, lead, and mercury, nevertheless the amount of leachable arsenic, lead, and mercury is actually lower in the test ash than in the baseline.

Example 13

PRB coal (75% passing 200 mesh) is burned in a balanced draft tangentially fired furnace to produce 160 MWatts of power. The coal is burned for a time period to produce 8 box cars of fly ash. A powder sorbent is added at a rate of 4-6% by weight into the system during the time period. For the first third of the time period, addition of sorbent is solely into the furnace at a location just below the nose of the furnace through a lance inserted through the furnace wall; for the next third, addition of sorbent is half into the furnace and half onto the powdered coal pre-combustion; for the final third, addition of powder sorbent is 100% onto the coal pre-combustion. Throughout the time period, a liquid sorbent (50% by weight calcium bromide in water) is added onto the powdered coal pre-combustion at a rate of 0.15% by weight, based on the rate of coal consumption. A consolidated sample representative of the eight box cars of ash is collected and measured for leaching using the US EPA TCLP procedure. The leaching result for barium is 26 ppm, well below the regulatory level of 100 ppm. TCLP values for As, Cd, Cr, Pb, Hg, Se, and Ag are below the detection limits of the test. In particular, mercury leaching is <0.0020 ppm, which is less than 2 ppb.

What is claimed is:

1. A process for burning mercury containing fuel in a furnace of a fuel burning system to reduce the amount of mercury released from the system into the environment, the process comprising:
    adding a sorbent composition comprising bromine or iodine onto the coal upstream of the furnace;
    delivering the fuel with the applied sorbent composition into the furnace;
    adding sorbent components comprising calcium, silica, and alumina into the furnace where the temperature is greater than 2000° F.; and
    combusting the fuel in the furnace to produce combustion gases, ash and heat energy.

2. A process according to claim 1, wherein the fuel is coal.

3. A process according to claim 1, wherein the sorbent composition comprises a bromine compound.

4. A process according to claim 1, wherein the sorbent composition comprises calcium bromide.

5. A process according to claim 1, wherein the sorbent composition comprises a solution of a bromine compound.

6. A process according to claim 1, wherein the sorbent composition comprises an iodine compound.

7. A process according to claim 1, wherein the temperature is greater than 2300° F.

8. A process according to claim 1, wherein the temperature is 2700° F.-3600° F.

9. A process according to claim 2, wherein the ash contains 90% or more by weight of the mercury originally in the coal.

10. A process according to claim 1, wherein the amount of mercury in the ash is increased and the amount of acid leachable mercury in the ash is decreased, compared to the respective levels found in ash produced by burning coal without the added sorbent composition and the sorbent components comprising calcium, silica, and alumina.

11. A process for reducing the amount of mercury escaping from a facility upon combustion of a mercury containing fuel in a furnace of the facility, the process comprising:
    adding a first sorbent composition comprising bromine onto the fuel upstream of the furnace;
    delivering the fuel with the added sorbent composition into the furnace;
    adding a second sorbent composition comprising 50-98% by weight of an alkaline powder containing calcium and 2-50% by weight of an aluminosilicate material into the furnace where the temperature is greater than 2000° F.; and
    combusting the fuel in the furnace to produce ash, combustion gases, and heat energy.

12. A process according to claim 11, wherein the fuel is coal.

13. A process according to claim 11, further comprising measuring the mercury level in the combustion gases and adjusting the amount of bromine added depending on the measured mercury level.

14. A process according to claim 12, wherein the ash contains 90% or more by weight of the mercury originally in the coal.

15. A process according to claim 12, wherein the ash has a higher mercury concentration but a lower acid leachable concentration than ash produced from burning coal without the added first and second compositions.

16. A process according to claim 12, wherein the temperature is 2700-3600° F.

17. A process according to claim 12, wherein the alkaline powder containing calcium comprises one or more of Portland cement, lime kiln dust, and cement kiln dust.

18. A process according to claim 17, wherein the alkaline powder containing calcium comprises cement kiln dust and lime kiln dust.

19. A process according to claim 12, wherein the aluminosilicate material comprises calcium montmorillonite, sodium montmorillonite, or kaolin.

20. A process according to claim 12, wherein the first composition comprises calcium bromide.

21. A method of burning coal with reduced levels of undesirable elements escaping into the environment, comprising:
    applying a solution of calcium bromide onto the coal;
    delivering the coal with the calcium bromide applied into a coal burning furnace;
    injecting a powder sorbent comprising an aluminosilicate mineral and one or more of portland cement, cement kiln dust, and lime kiln dust into the furnace where the temperature is greater than 1000° F.; and
    combusting the coal in the presence of the added calcium bromide and the injected powder to produce ash, combustion gases, and heat energy.

22. A method according to claim 21, wherein the powder sorbent comprises cement kiln dust and lime kiln dust.

23. A method according to claim 21, wherein the temperature is greater than 1500° F.

24. A method according to claim 21, wherein the temperature is greater than 2000° F.

25. A method according to claim 21, wherein the temperature is greater than 2300° F.

26. A method according to claim 21, wherein the temperature is 2700° F.-3600° F.

27. A method according to claim 21, wherein the ash has a higher mercury level but a lower acid leachable level in comparison to ash prepared by burning the coal without the applied calcium bromide and powder sorbent.

28. A method according to claim 21, wherein the ash contains 90% or more of the total weight of mercury originally present in the coal prior to combustion.

29. A method according to claim 21, wherein the powder sorbent comprises 2-50% by weight aluminosilicate and 50-98% by weight of a mixture of cement kiln dust and lime kiln dust.

30. A method according to claim 21, comprising adding the calcium bromide at a rate 0.01-1% by weight of solid calcium bromide and adding the powder sorbent at a rate of 0.01-10% by weight, both based on the amount of coal being consumed by combustion.

31. A method according to claim 21, wherein the solution of calcium bromide is 50% by weight calcium bromide solution in water.

32. A method for reducing mercury levels in the flue gases resulting from combustion of the coal in the furnace of a coal burning system, the method comprising:
 applying sorbent components comprising halogen, calcium, silica, and alumina onto coal;
 delivering the coal with the applied sorbent components into the furnace; and
 combusting the coal with the applied sorbent components in the furnace to produce ash, combustion gases, and heat energy.

33. A method according to claim 32, further comprising measuring a mercury level in the combustion gases and adjusting the amount of halogen applied onto the coal based on the value of the mercury level.

34. A method according to claim 32, further comprising measuring acid leaching of mercury from the ash and adjusting the amount of silica and alumina applied onto the coal based on the value of the measured leaching.

35. A method according to claim 32, comprising adding a liquid composition comprising a bromine compound onto the coal.

36. A method according to claim 35, wherein the liquid composition is a solution of calcium bromide in water.

37. A method according to claim 32, when the sorbent components comprise an aluminosilicate mineral and one or more of Portland cement, cement kiln dust, and lime kiln dust.

38. A method according to claim 32, wherein the ash contains 90% or more by weight of the mercury present in the coal before combustion.

39. A method of burning a mercury containing fuel in a furnace of a fuel burning system to reduce emissions of mercury or other heavy metals to the environment outside the system, the method comprising:
 adding sorbent components comprising halogen, calcium, silica, and alumina onto the fuel upstream of the furnace, into the furnace, or into a convective pathway downstream of the furnace where the temperature is greater than 1500° F.; and
 combusting the fuel to produce ash, combustion ashes, and heat energy.

40. A method according to claim 39, wherein one or more sorbent components are added into the furnace where the temperature is greater than 2000° F.

41. A method according to claim 39, wherein one or more of the sorbent components is added into the furnace where the temperature is greater than 2300° F.

42. A method according to claim 39, wherein one or more of the components is added into the furnace where the temperature is greater than 2700° F.

43. A method according to claim 39, wherein the fuel is municipal waste.

44. A method according to claim 39, wherein the fuel is coal.

45. A method according to claim 44, wherein 90% of the mercury in the coal is captured in the ash produced upon combusting the coal.

46. A method according to claim 44, further comprising measuring the mercury level in the combustion gases and adjusting the amount of halogen added based on the value of the measured mercury level.

47. A method according to claim 44, further comprising measuring acid leaching of mercury from the ash and adjusting the amount of silica and alumina added based on the value of the measured leaching.

* * * * *